US011921970B1

(12) United States Patent
Hoover et al.

(10) Patent No.: US 11,921,970 B1
(45) Date of Patent: Mar. 5, 2024

(54) COORDINATING VIRTUAL INTERACTIONS WITH A MINI-MAP

(71) Applicant: Meta Platforms Technologies, LLC, Menlo Park, CA (US)

(72) Inventors: Paul Armistead Hoover, Bothell, WA (US); Jing Ma, Mill Creek, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 17/498,245

(22) Filed: Oct. 11, 2021

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/011* (2013.01); *G06F 3/04842* (2013.01);
(Continued)

(58) Field of Classification Search
CPC .. G06F 3/04815; G06F 3/011; G06F 3/04842; G06F 3/16; G06F 16/287; G06F 16/29; G06F 2203/04806; G06T 13/40; G06T 2200/24; H04L 65/403; H04L 67/131; H04S 7/302
See application file for complete search history.

(56) References Cited

U.S. PATENT DOCUMENTS 6,559,863 B1 * 5/2003 Megiddo .................. H04N 7/15
348/E7.083
8,537,196 B2 9/2013 Hegde et al.
(Continued)

FOREIGN PATENT DOCUMENTS

CA 3039347 A1 4/2018
WO 2020117657 A1 6/2020

OTHER PUBLICATIONS

Gupta K., et al., "Do You See What I See? The Effect of Gaze Tracking on Task Space Remote Collaboration," IEEE Transactions on Visualization and Computer Graphics, Nov. 2016, vol. 22, No. 11, pp. 2413-2422, DOI: 10.1109/TVCG.2016.2593778.
(Continued)

*Primary Examiner* — Nhat Huy T Nguyen
(74) *Attorney, Agent, or Firm* — Potomac Law Group, PLLC; Dannon G. Allbee

(57) ABSTRACT

Aspects of the present disclosure are directed to a mini-map coordination system that can facilitate interactions between co-located and non-co-located users by providing a min-map through an artificial reality system. The mini-map can be a representation of a virtual space that corresponds to a real-world space in which some users are located and that other users join virtually. Users can join the space by entering the real-world space or by remotely logging into the virtual space. Users who have joined the virtual space can be represented in the mini-map by avatars. Users moving their avatars around the mini-map can trigger interactions, such as automatically initiating a holographic call between the users whose avatars come within a threshold distance of each other. The system can allow remote users to observe social norms such as requiring a user to "knock" before their avatar is allowed to enter a private space.

20 Claims, 19 Drawing Sheets

(51) Int. Cl.
  *G06F 3/0482* (2013.01)
  *G06F 3/04842* (2022.01)
  *G06F 3/16* (2006.01)
  *G06F 16/28* (2019.01)
  *G06F 16/29* (2019.01)
  *G06T 13/40* (2011.01)
  *H04L 65/403* (2022.01)
  *H04L 67/131* (2022.01)
  *H04S 7/00* (2006.01)

(52) U.S. Cl.
  CPC ............. *G06F 3/16* (2013.01); *G06F 16/287* (2019.01); *G06F 16/29* (2019.01); *G06T 13/40* (2013.01); *H04L 65/403* (2013.01); *H04L 67/131* (2022.05); *H04S 7/302* (2013.01); *G06F 2203/04806* (2013.01); *G06T 2200/24* (2013.01)

(56) References Cited

U.S. PATENT DOCUMENTS

| | | | |
|---|---|---|---|
| 8,581,958 B2 | 11/2013 | Baker et al. | |
| 8,675,067 B2 | 3/2014 | Chou et al. | |
| 9,338,404 B1 | 5/2016 | Egeler et al. | |
| 9,401,095 B2 | 7/2016 | Kubota et al. | |
| 9,460,340 B2 | 10/2016 | Kauffmann et al. | |
| 9,841,814 B1 | 12/2017 | Kallmeyer et al. | |
| 9,959,676 B2 | 5/2018 | Barzuza et al. | |
| 10,182,210 B1 | 1/2019 | Goetzinger, Jr. | |
| 10,298,587 B2 | 5/2019 | Hook et al. | |
| 10,311,383 B2 | 6/2019 | Holmes et al. | |
| 10,403,050 B1 | 9/2019 | Beall et al. | |
| 10,499,033 B2 | 12/2019 | Pesonen | |
| 10,554,931 B1 | 2/2020 | Zavesky et al. | |
| 10,582,191 B1 | 3/2020 | Marchak, Jr. et al. | |
| 10,664,772 B1 | 5/2020 | Poel et al. | |
| 10,701,318 B2 | 6/2020 | Valli | |
| 10,917,613 B1 | 2/2021 | Chiarella et al. | |
| 10,952,006 B1 | 3/2021 | Krol et al. | |
| 11,140,361 B1 | 10/2021 | Krol et al. | |
| 11,302,085 B2 | 4/2022 | LeBeau et al. | |
| 11,394,925 B1 | 7/2022 | Faulkner et al. | |
| 11,456,887 B1 | 9/2022 | McCracken et al. | |
| 11,528,312 B2 | 12/2022 | Oyman | |
| 11,563,779 B2 | 1/2023 | Copley et al. | |
| 2002/0158873 A1 | 10/2002 | Williamson | |
| 2007/0279484 A1 | 12/2007 | Derocher et al. | |
| 2009/0288007 A1 | 11/2009 | Leacock et al. | |
| 2009/0300516 A1 | 12/2009 | Jerrard-Dunne et al. | |
| 2010/0085416 A1 | 4/2010 | Hegde et al. | |
| 2011/0107270 A1 | 5/2011 | Wang et al. | |
| 2012/0192088 A1* | 7/2012 | Sauriol | G06F 3/012 715/757 |
| 2012/0204118 A1 | 8/2012 | Lefar et al. | |
| 2012/0246582 A1 | 9/2012 | Leacock et al. | |
| 2012/0317501 A1 | 12/2012 | Milou | |
| 2013/0024785 A1 | 1/2013 | Van Wie | |
| 2014/0085316 A1 | 3/2014 | Narayanan | |
| 2014/0085406 A1 | 3/2014 | Narayanan | |
| 2014/0096036 A1 | 4/2014 | Mohler | |
| 2015/0215581 A1 | 7/2015 | Barzuza et al. | |
| 2015/0271220 A1 | 9/2015 | Kleiner et al. | |
| 2015/0279044 A1 | 10/2015 | Kim et al. | |
| 2016/0050394 A1 | 2/2016 | Segal | |
| 2016/0093108 A1 | 3/2016 | Mao et al. | |
| 2016/0132221 A1* | 5/2016 | Lasser | H04N 21/4788 715/732 |
| 2016/0155187 A1 | 6/2016 | Paulrajan et al. | |
| 2016/0156584 A1 | 6/2016 | Hum et al. | |
| 2016/0163070 A1 | 6/2016 | Leacock et al. | |
| 2016/0353062 A1 | 12/2016 | Ono et al. | |
| 2017/0257405 A1 | 9/2017 | Lo et al. | |
| 2017/0357917 A1 | 12/2017 | Holmes et al. | |
| 2018/0063480 A1 | 3/2018 | Luks et al. | |
| 2018/0095635 A1 | 4/2018 | Valdivia et al. | |
| 2018/0098059 A1 | 4/2018 | Valdivia et al. | |
| 2018/0101989 A1 | 4/2018 | Frueh et al. | |
| 2018/0139246 A1 | 5/2018 | Rosenberg | |
| 2018/0144212 A1 | 5/2018 | Burgos et al. | |
| 2018/0158246 A1 | 6/2018 | Grau et al. | |
| 2018/0227138 A1 | 8/2018 | Faulkner et al. | |
| 2018/0234671 A1 | 8/2018 | Yang et al. | |
| 2018/0356885 A1 | 12/2018 | Ross et al. | |
| 2019/0042640 A1 | 2/2019 | Valeski | |
| 2019/0045157 A1 | 2/2019 | Venshtain et al. | |
| 2019/0058870 A1 | 2/2019 | Rowell et al. | |
| 2019/0130629 A1 | 5/2019 | Chand et al. | |
| 2019/0171354 A1 | 6/2019 | Dascola et al. | |
| 2019/0253667 A1 | 8/2019 | Valli | |
| 2019/0279424 A1 | 9/2019 | Clausen et al. | |
| 2019/0310757 A1 | 10/2019 | Lee et al. | |
| 2019/0325658 A1 | 10/2019 | Park et al. | |
| 2019/0327392 A1 | 10/2019 | Sarkar | |
| 2019/0346522 A1 | 11/2019 | Botnar et al. | |
| 2019/0371060 A1 | 12/2019 | Energin et al. | |
| 2019/0379750 A1 | 12/2019 | Zamora Duran et al. | |
| 2020/0090350 A1 | 3/2020 | Cho et al. | |
| 2020/0099891 A1 | 3/2020 | Valli et al. | |
| 2020/0118342 A1 | 4/2020 | Varshney et al. | |
| 2020/0128033 A1 | 4/2020 | Kawakita | |
| 2020/0142475 A1 | 5/2020 | Paez et al. | |
| 2020/0154166 A1* | 5/2020 | Rakshit | H04N 21/2187 |
| 2020/0279411 A1 | 9/2020 | Atria et al. | |
| 2020/0296327 A1* | 9/2020 | Karafin | G03H 1/24 |
| 2020/0329214 A1 | 10/2020 | Ahn et al. | |
| 2020/0371665 A1 | 11/2020 | Clausen et al. | |
| 2020/0396266 A1 | 12/2020 | Goel | |
| 2021/0019541 A1 | 1/2021 | Wang et al. | |
| 2021/0029326 A1 | 1/2021 | Oyman et al. | |
| 2021/0099433 A1 | 4/2021 | Soryal et al. | |
| 2021/0120066 A1 | 4/2021 | Oyman et al. | |
| 2021/0149627 A1 | 5/2021 | Jang et al. | |
| 2021/0248727 A1 | 8/2021 | Fisher et al. | |
| 2021/0263593 A1 | 8/2021 | Lacey | |
| 2021/0281802 A1 | 9/2021 | Kirisken | |
| 2021/0336784 A1 | 10/2021 | Athlur et al. | |
| 2021/0385412 A1 | 12/2021 | Matula et al. | |
| 2021/0390767 A1 | 12/2021 | Johnson et al. | |
| 2021/0392175 A1 | 12/2021 | Gronau et al. | |
| 2021/0392296 A1 | 12/2021 | Rabinovich et al. | |
| 2021/0407520 A1 | 12/2021 | Neckermann et al. | |
| 2022/0084288 A1 | 3/2022 | LeBeau et al. | |
| 2022/0086167 A1 | 3/2022 | LeBeau et al. | |
| 2022/0086205 A1 | 3/2022 | LeBeau et al. | |
| 2022/0103386 A1 | 3/2022 | Jensen | |
| 2022/0109810 A1* | 4/2022 | Kancharlawar | H04N 7/157 |
| 2022/0116431 A1 | 4/2022 | Mayfield et al. | |
| 2022/0150083 A1 | 5/2022 | Faulkner | |
| 2022/0157342 A1 | 5/2022 | Kliushkin et al. | |
| 2022/0172444 A1 | 6/2022 | Ebeau et al. | |
| 2022/0174108 A1 | 6/2022 | Oyman | |
| 2022/0200979 A1 | 6/2022 | Wenzel | |
| 2022/0229535 A1 | 7/2022 | Evangelista et al. | |
| 2022/0385490 A1 | 12/2022 | Lin et al. | |
| 2022/0417308 A1 | 12/2022 | Oyman | |
| 2023/0082461 A1 | 3/2023 | Gal et al. | |
| 2023/0198745 A1 | 6/2023 | Vansteenkiste et al. | |

OTHER PUBLICATIONS

International Search Report and Written Opinion for International Application No. PCT/US2021/038992, dated Oct. 29, 2021, 16 pages.

Unknown., "A Better Way to Meet Online," Gather, https://www.gather.town/, Last Accessed Oct. 11, 2021.

Unknown, Gather, A better way to meet online, hllps://www.gather.town/, last accessed Oct. 11, 2021.

International Search Report and Written Opinion for International Application No. PCT/US2023/012192, dated May 4, 2023, 8 pages.

Baxter D.B., "Creating Treemap Chart Using JavaScript," AnyChart News, Aug. 1, 2019, 12 Pages.

(56) References Cited

OTHER PUBLICATIONS

EBook Reader, "Viewing Popular Highlights on Kindles," [Online], Feb. 15, 2018 [Retrieved on Aug. 5, 2020], 11 Pages, Retrieved from Internet: URL: https://blog.the-ebook-reader.com/2018/02/15/viewing-popular-highlights-on-kindles/.

Garofalakis J., et al., "Personalized Web Search by Constructing Semantic Clusters of User Profiles," Springer Link [Online], 2008 [Retrieved on Aug. 5, 2020], 6 Pages, Retrieved on Internet: URL: https://link.springer.com/chapter/10.1007/978-3-540-85565-1_30.

Gauch S., et al., "Ontology-Based User Profiles for Search and Browsing," [Online], 2002 [Retrieved on Aug. 5, 2020], 6 Pages, Retrieved from Internet: URL: https://www.semanticscholar.org/paper/Ontology-Based-User-Profiles-for-Search-and-Gauch-Chaffee/93af7304757a9beabb10bfbca55b04045bf2ef90.

Jikadra R., et al., "Video Calling with Augmented Reality Using WebRTC API," 2019 6th International Conference on Computing for Sustainable Global Development (INDIACom), Mar. 13, 2019, 5 pages.

"Pinterest Communities What are they and How can you Join?," Ivory Mix, Aug. 5, 2020, 19 Pages, Retrieved from Internet: URL: https://ivorymix.com/pinterest-communities/.

Schmeiser L., "Microsoft Analytics Aims to Analyze Worker Habits, Point to More Productivity," [Online], Jul. 5, 2017 [Retrieved on Aug. 5, 2020], 3 Pages, Retrieved from Internet: URL: https://www.itprotoday.com/office-365/microsoft-analytics-aims-analyze-worker-habits-point-more-productivity.

Semantic Arts, "White Paper: Semantic Profiling," [Online], Jan. 21, 2015 [Retrieved on Aug. 5, 2020], 11 Pages, Retrieved from Internet: https://www.semanticarts.com/white-paper-semantic-profiling/.

Shanmugam M., et al., "Research Opportunities on Virtual Reality and Augmented Reality: A Survey," 2019 IEEE International Conference on System, Computation, Automation and Networking (ICSCAN), Mar. 29, 2019, 6 pages.

Song X., et al., "A Scalable and Statistically Robust Beam Alignment Technique for mm-Wave Systems," May 8, 2018, 13 pages.

Tarpani G., "What is Google Wave?," Macworld [Online], Feb. 22, 2010 [Retrieved on Aug. 5, 2020], 7 Pages, Retrieved from Internet: URL: https://www.macworld.com/article/1146555/whatisgooglewave.html.

Wanders I., "Build your Own Knowledge Graph: From Unstructured Dark Data to Valuable Business Insights," Vector Consulting [Online], Oct. 18, 2018 [Retrieved on Aug. 5, 2020], 8 Pages, Retrieved from Internet: https://medium.com/vectrconsulting/build-your-own-knowledge-graph-975cf6dde67f.

Wikipedia, The Free Encyclopedia, "Google Wave," [Online], Aug. 5, 2020, 1 Page, Retrieved from Internet: URL: https://simple.wikipedia.org/wiki/Google_Wave.

Wikipedia, The Free Encyclopedia, "Treemapping," Aug. 5, 2020, 13 Pages, Retrieved from Internet: URL: https://en.wikipedia.org/wiki/Treemapping.

Wikipedia: The Free Encyclopedia, "Unconference," Aug. 5, 2020, 3 Pages, Retrieved from Internet: URL: https://en.wikipedia.org/wiki/Unconference.

\* cited by examiner

COORDINATING VIRTUAL INTERACTIONS WITH A MINI-MAP

TECHNICAL FIELD

The present disclosure is directed to an artificial reality system that facilitates interactions between users, some of whom are co-located in a space (e.g., building) and others who are remote, by employing a min-map of the space.

BACKGROUND

As the global marketplace increases, remote collaboration is becoming ever more common. Remote collaboration typically involves an assortment of technologies such as remote access to shared documents, various texts-based communication services (e.g., email, instant message, text message, etc.), telephone communication, and video calling. Such remote collaboration provides a number of benefits, such as reduced travel times, increased health and safety, and greater flexibility. However, remote users face a number of challenges not experienced by their in-office counterparts. For example, video calls remain a pale imitation of face-to-face interactions. Understanding body language and context can be difficult with only a two-dimensional ("2D") representation of a sender. Remote users often complain of missing out on the "watercooler" conversations, and often feel forgotten by their coworkers. Further, collaboration between teams in remote locations using traditional voice, 2D communication channels, or even virtual conference rooms have been less effective than in-person experiences. For example, social norms are difficult to observe, starting interactions requires planning and coordination, and people don't have impromptu communications or the ability to "drop by" a co-worker's desk.

Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Various XR environments exist, allowing representations of users to move about and speak with one another. However, such XR environments hove not effectively been created that are comfortable and natural (especially for a multi-room experience), nor do they address the complications of some users being co-located while others attend virtually.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
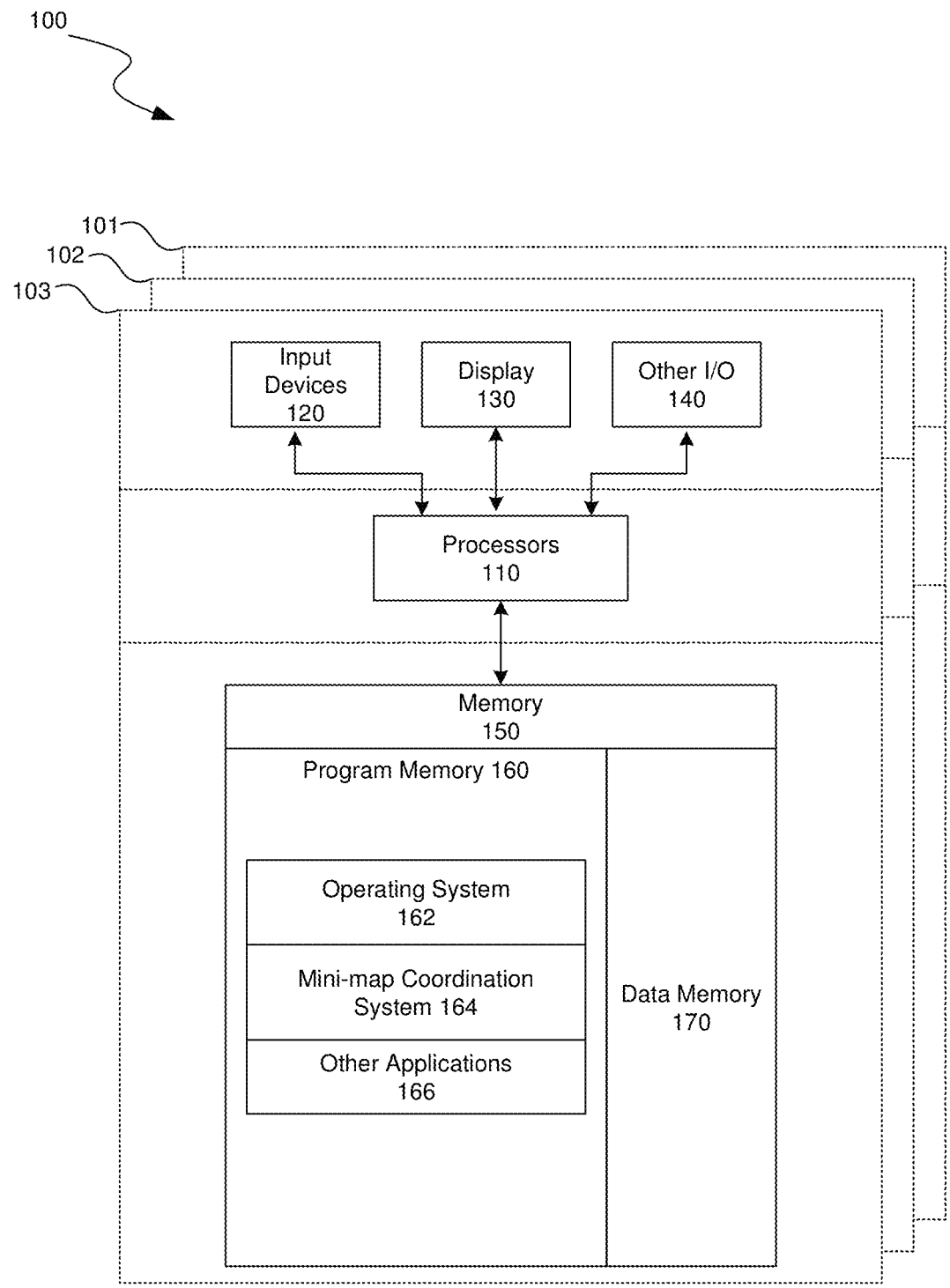
FIG. 1 is a block diagram illustrating an overview of devices on which some implementations of the present technology can operate.

Aspects of the present disclosure are directed to a mini-map coordination system that can facilitate interactions between co-located and non-co-located users by providing a min-map through an artificial reality system. In some implementations, the mini-map can be a representation of a virtual space, that corresponds to a real-world space in which some users are located, and that other users join virtually. Users can join the space by entering the real-world space or by remotely logging into the virtual space. Users who have joined the virtual space can be represented in the mini-map.

The virtual space can provide various visual outputs (via the mini-map) and audio outputs. For example, the user may be able to zoom in and out on sections of the mini-map; the mini-map may provide representations of 3D objects or other content items users are working with; and the user may be able to employ controls to search and discover people and content in the mini-map, filter entities from the mini-map, or apply privacy settings to their avatar and content items. As another example, the mini-map coordination system can provide spatial audio according to the positions of the avatars in the mini-map. More specifically, if one user says something into her microphone, another user whose avatar is in front of the avatar of that user can hear the audio according to the relative positions of the avatars. Additional details on coordinating interactions with a mini-map are provided below in relation to FIGS. 5 and 8-10.

In various cases, the users can move their avatars around the mini-map by moving around the real-world space and/or by sending avatar movement commands to the mini-map coordination system. This can allow remote users to encounter others in a manner similar to that experienced by co-located users, i.e., providing the "watercooler" moments that are often missing for remote workers. In some instances, avatars moving around the mini-map can trigger interactions. For example, when multiple avatars come within a threshold distance of one another in the mini-map, the mini-map coordination system can automatically initiate a holographic call between the users represented by those avatars. This allows users to have experiences that are similar to in-person interactions, whereby when a user "walks up to" (e.g., causes their avatar to approach) another user, they can easily begin a conversation through the holographic call. Additional details on triggering a holographic call based on an avatar distance threshold are provided below in relation to FIGS. 7 and 12.

The mini-map coordination system further provides remote users the ability to observe social norms that are lacking from traditional remote interactions. For example, a user may be able to have their avatar approach a room where another avatar is located and perform a "knock" action giving the user controlling the other avatar the option to permit or deny entry. As another example, a user can have their avatar enter a space controlled by another user, and their avatar and interactions may be limited (e.g., showing the avatar as greyed-out, disallowing the user to communicate with others in that space, etc.) until the owner of the space approves them for full access to the space. Additional details on determining authorization to enter a virtual space are provided below in relation to FIGS. 6 and 11.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

While there are existing virtual environment systems, they fail to provide interactions that provide the benefits afforded co-located users, they are cumbersome to use, they often result in miscommunications, and they generally take considerable user effort and time to use. These existing system often fail to even consider interactions for both co-located and remote users, instead treating all users as remote. Further, remote working systems generally include a host of separate communication, file sharing, and productivity tools, which often do not work well together, are difficult to move content between, and often also result in lost content or miscommunications.

The mini-map coordination system and processes described herein are expected to overcome these problems associated with using existing collaboration tools, providing more realistic interactions, better content sharing, and linking real-world spaces to a mini-map for both movement and establishing interactions. In particular, by providing a mini-map in which multiple users can control movement of their avatars and show their content items, users can see where other users are located, what they are working on, if they are busy, and can experience spatially oriented interactions similar to a co-located experience. Using a mini map provides other users' contexts without the system having to display a large area representation of those user's artificial reality environments, providing this useful information while reducing power consumption and heat output otherwise required to display a large representation of another user's artificial reality environment. Further, when users move their avatars in the mini-map, the mini-map coordination system can provide for chance encounters between users, can allow users to implement social norms (e.g., using social cues such as requesting to join a group or knocking to enter a space), and can implement face-to-face like communications (e.g., holographic calls) in response to these movements without the users having to coordinate the call ahead of time or use a clunky calendar interface. Yet further, while the mini-map coordination system disclosed herein provides a result comparable with, and in some cases an improvement over, in-person interactions, the processes and systems to achieve these benefits are not analogs of existing communication techniques, but instead introduce completely new ways of visualizing interactions through a virtual space represented by a mini-map, easy ways to start communications, chance encounters between non-co-located users, the ability to discover people and content, and a spatial orientation to interactions.

Several implementations are discussed below in more detail in reference to the figures. FIG. 1 is a block diagram illustrating an overview of devices on which some implementations of the disclosed technology can operate. The devices can comprise hardware components of a computing system 100 that facilitates interactions between users, some of whom are co-located in a space and others who are remote, by employing a min-map of the space. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, mini-map coordination system 164, and other application programs 166. Memory 150 can also include data memory 170 that can include, e.g., mini-maps, scans of real-world places, authorization settings for avatars to enter portions of mini-maps, avatars, avatar locations in the mini-maps, content items users are working on, modal options, 3D/holographic calling data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
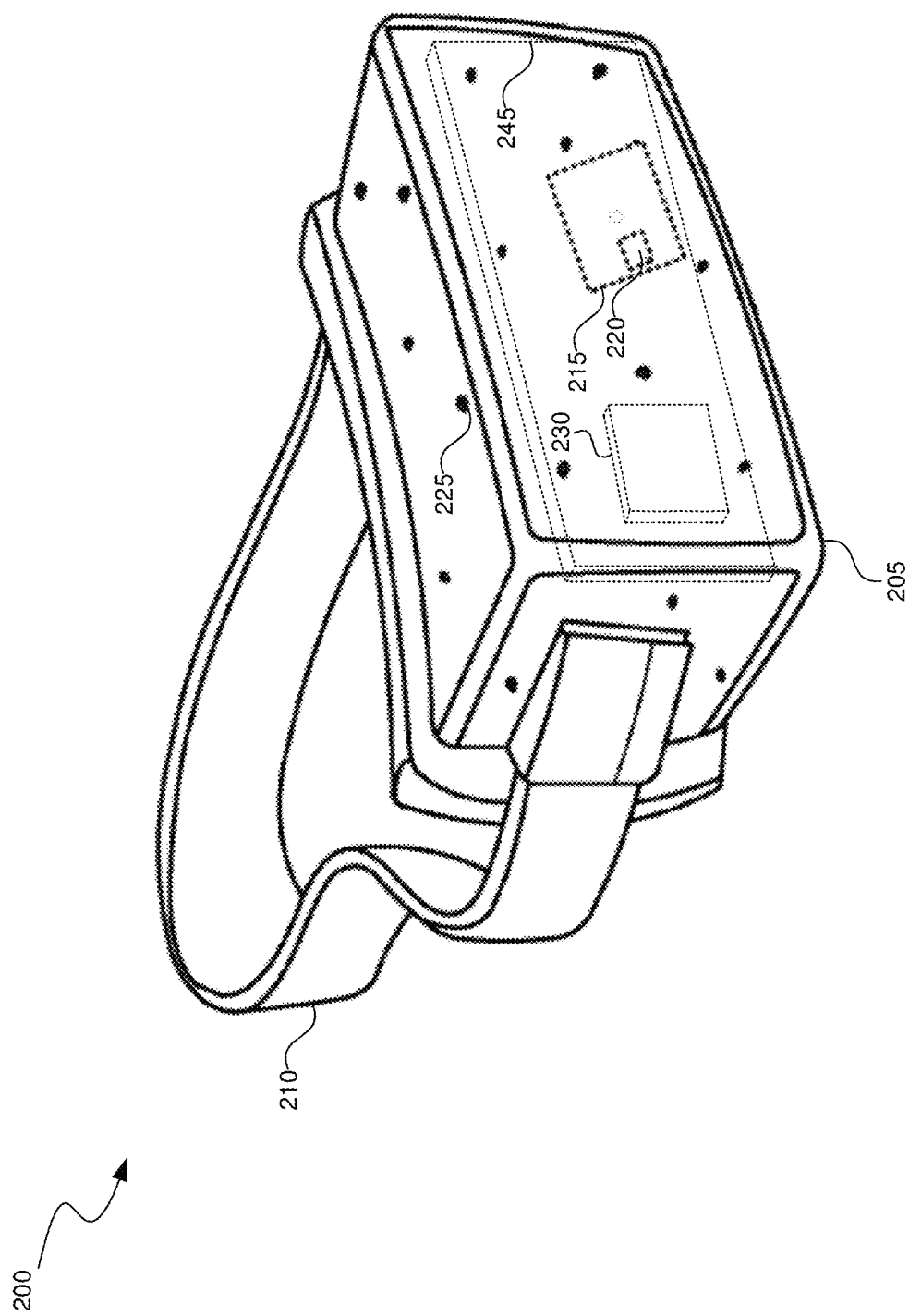
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other noncamera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
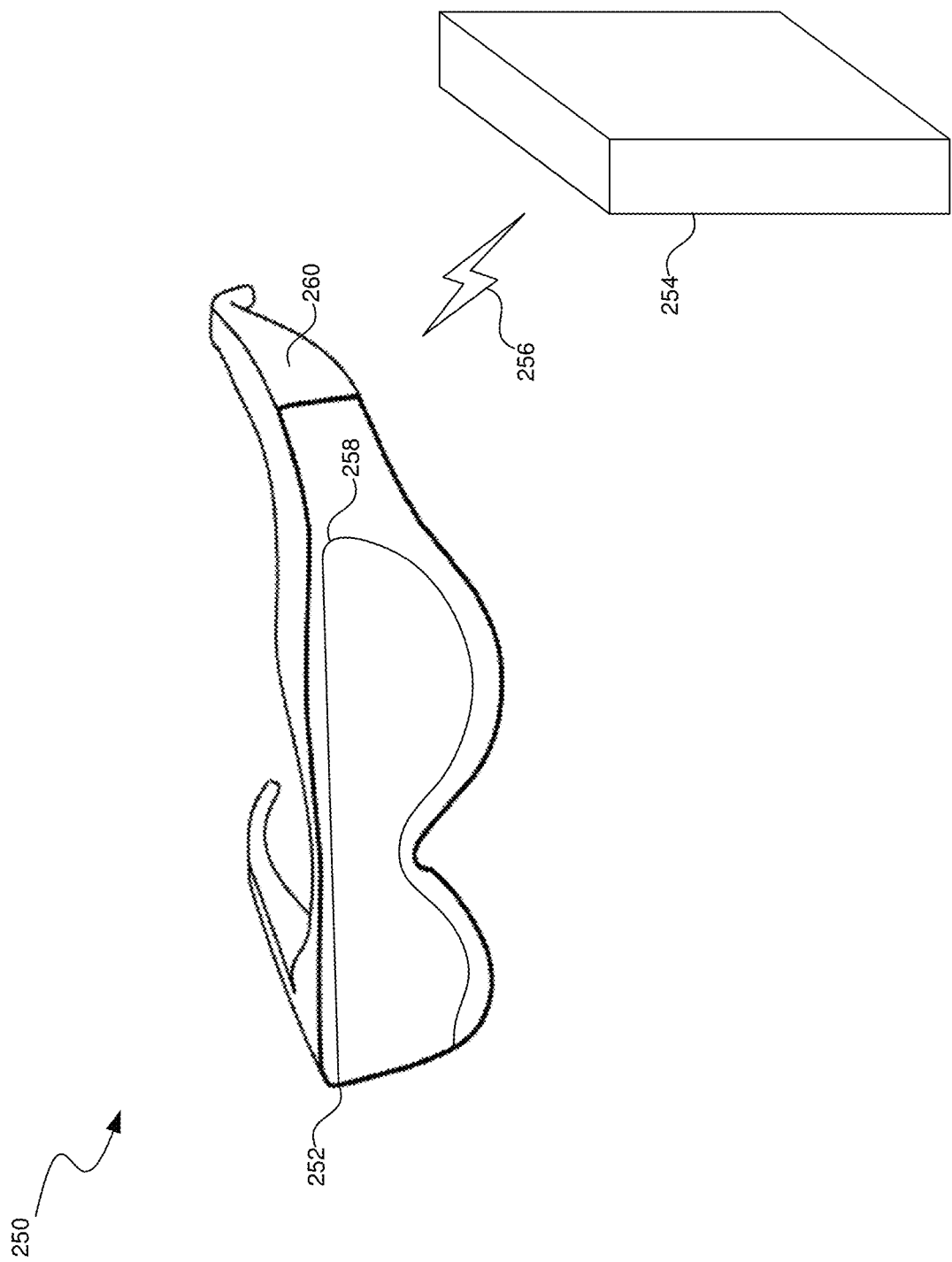
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
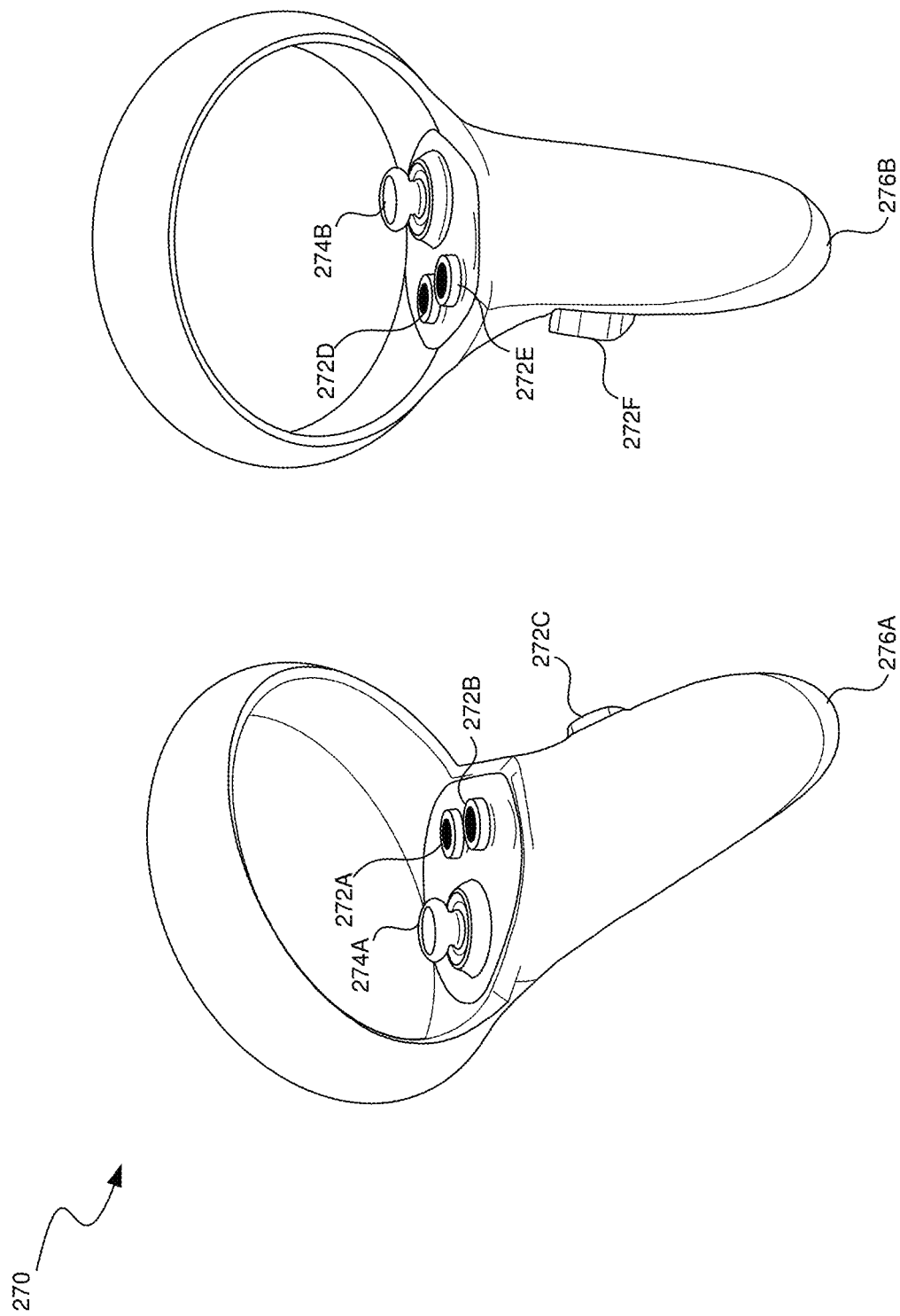
FIG. 2C is a wire diagram illustrating controllers which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
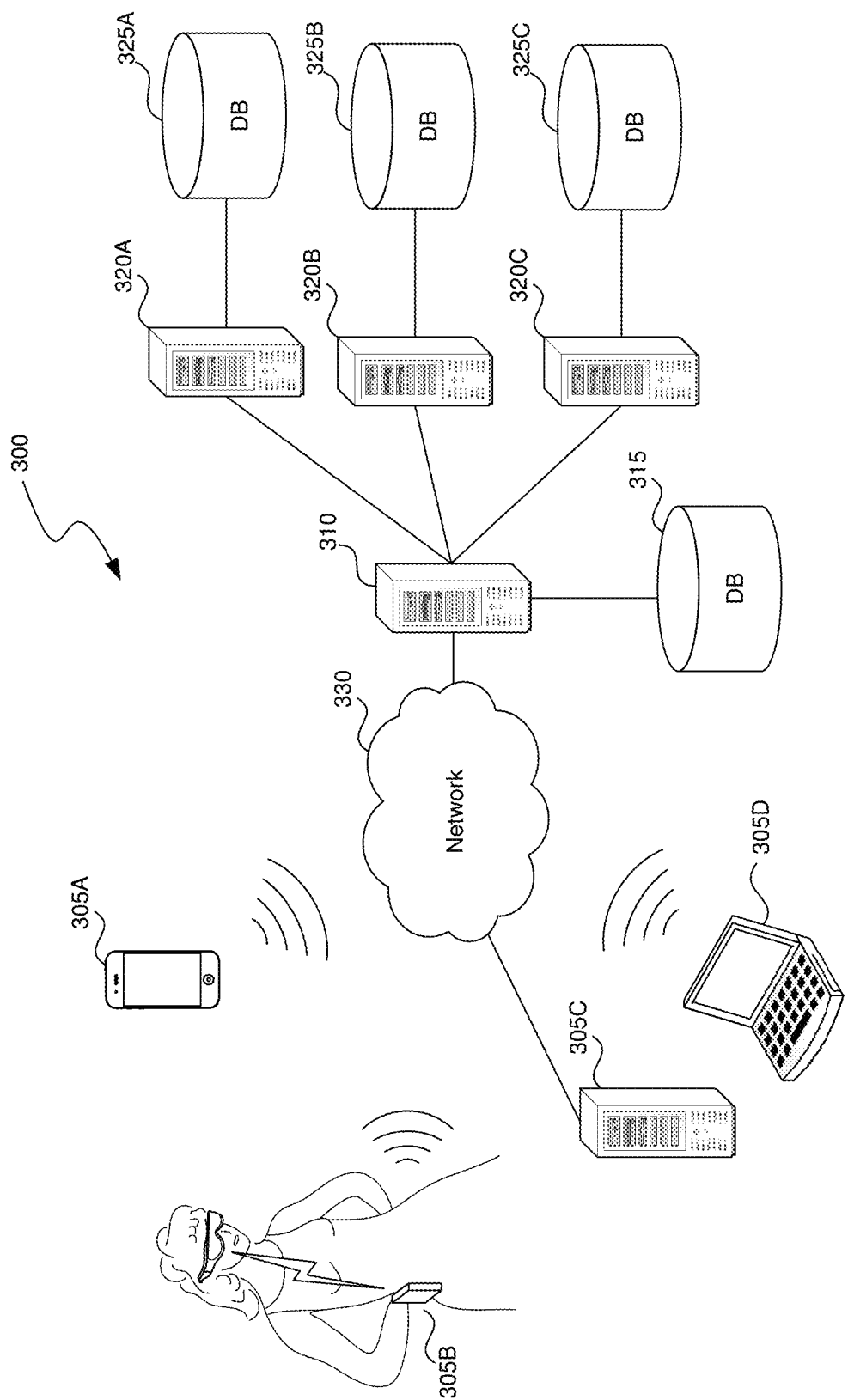
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
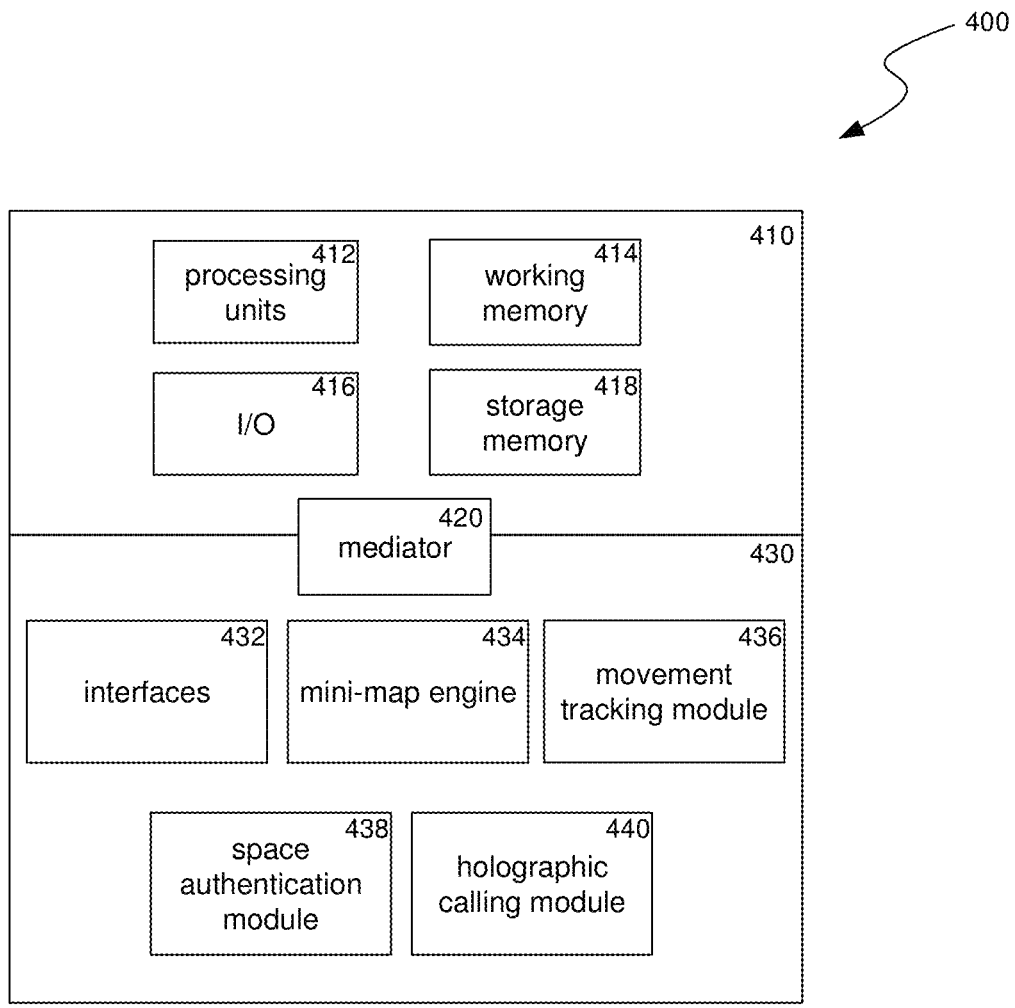
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for facilitating interactions between users of a virtual space by employing a min-map of the virtual space. Specialized components 430 can include mini-map engine 434, movement tracking module 436, space authentication module 438, holographic calling module 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

The mini-map engine 434 can build a mini-map for display to users who join a virtual space. In various implementations, the mini-map can be based on scans or images of a real-world space, can be structured according to a real-world space with different aesthetics, or can be a fully fictional space. The mini-map engine 434 can display avatars according to movement commands issued by the user controlling the avatar and/or based on users' real-world movements, tracked by movement tracking module 436. Additional details on presenting and updating a mini-map are provided below in relation to FIG. 5.

The movement tracking module 436 can track a user's real-world position to make updates to the user's corresponding avatar position (by mini-map engine 434). In various implementations, the movement tracking module 436 can accomplish this by obtaining SLAM data from an XR device or mobile phone, GPS data from a device associated with the user, and/or periodic check-in data such as from a user using an ID badge to access certain locations or through a wireless reader (e.g., RFID) detecting a user's tag. Additional details on tracking user movements for controlling an avatar in a mini-map are provided below in relation to block 506 of FIG. 5.

The space authentication module 438 can determine whether a user is allowed to access a portion of the virtual space, or whether the user must perform a social cue and get acceptance before entering the space. For such spaces, the space authentication module 438 can allow or deny certain avatar movements, according to user permissions and received authorizations. Additional details on allowing or denying avatar movements in a mini-map in relation to restricted spaces and social cues are provided below in relation to FIG. 6.

The holographic calling module 440 can conduct a holographic call between two or more users in response to the avatars representing the two or more users being within a threshold distance of one another in the mini-map. In some implementations, holographic calls can only be initiated when at least one of the users is connected to the virtual space from a remote location. Additional details on initiating a holographic call in response to avatar proximity on a mini-map are provided below in relation to FIG. 7.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
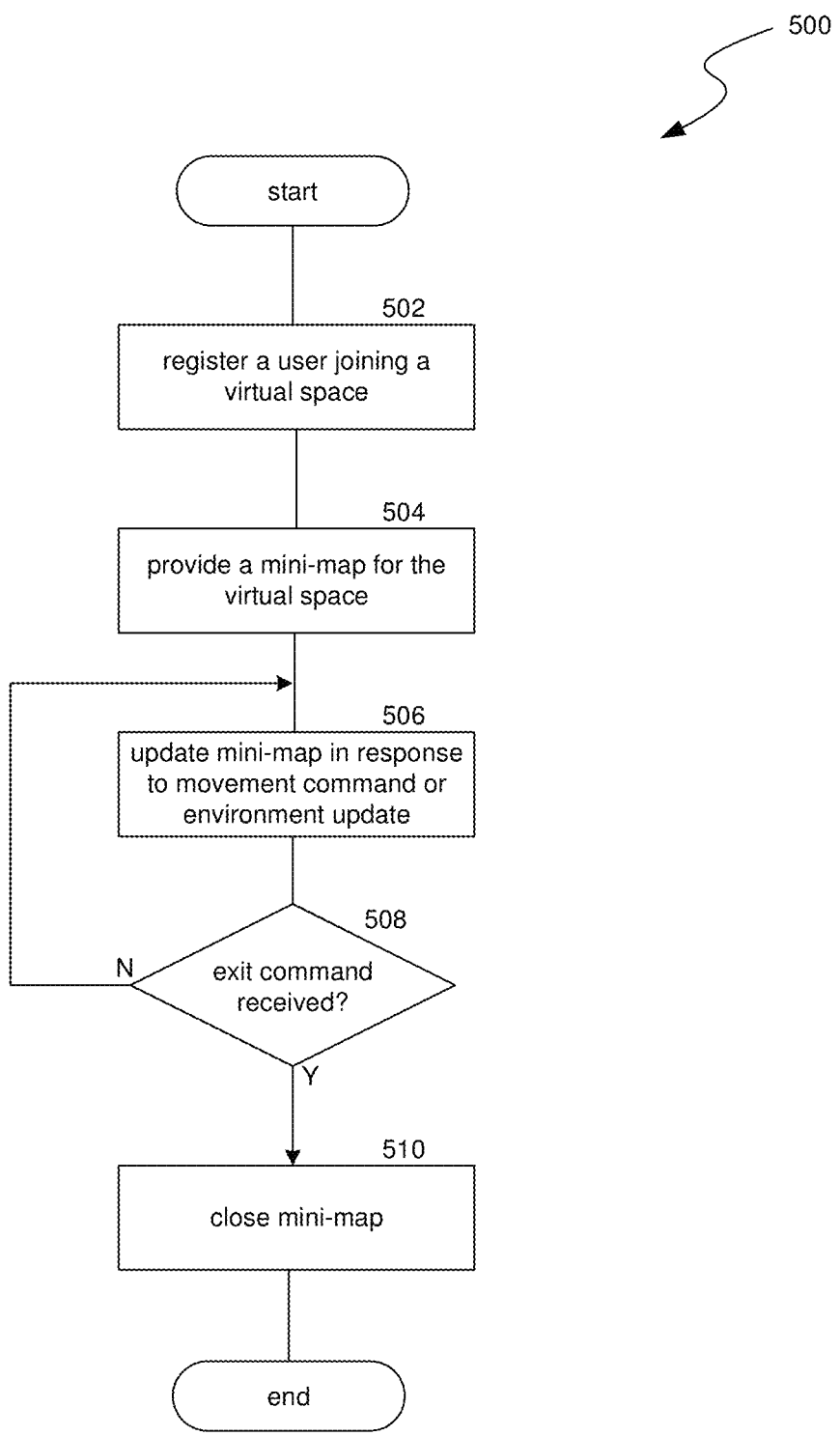
FIG. 5 is a flow diagram illustrating a process used in some implementations for coordinating interactions with a mini-map.

FIG. 5 is a flow diagram illustrating a process 500 used in some implementations for coordinating interactions with a mini-map. In various implementations, process 500 can be performed on a client system (e.g., an artificial reality device) or a server system (e.g., one or more servers providing services to one or more artificial reality devices). In various cases, process 500 can be performed in response to the creation of a virtual space corresponding to a real-world space, when an artificial reality device is started, or when the artificial reality device starts an application or service that supports virtual spaces (e.g., an operating system, "shell" in control of an artificial reality environment, a third-party application, etc.)

At block 502, process 500 can register a user joining a virtual space. A user can join a virtual space on various types of XR devices such as a wearable MR or VR device or with a flat-screen communication device (e.g., a phone, personal computer, dedicated video calling device, etc.) In some cases, a user can select to join the virtual space, e.g., by making an explicit selection of the virtual space (e.g., selecting it from a list, joining a meeting or call linked to the virtual space, navigating a map application to the virtual space, activating a URL or other link associated with the virtual space, etc.) or through another action correlated to the virtual space (e.g., going to a physical space, on which the virtual space is based, while wearing an XR device or while having another tracked device such as an ID badge).

In some implementations, a virtual space (or portion of a virtual space) can have access restrictions. For example, users can set public, by request, or private permissions for individual spaces or sub-spaces they own. A user can only enter the virtual space or sub-space by performing an authentication procedure and/or receiving an authorization from an owner of the space or sub-space. In some implementations, the authentication can be through an identity proof such as a username/password or biometric verification. In other cases, an owner of the space or sub-space can provide a token or other authorization for access. In yet further cases, a carry-over authentication can be used, e.g., based on having signed into another account on the XR or mobile device or having used a badge to access the corresponding physical space.

At block 504, process 500 can provide a mini-map for the virtual space. The mini-map can be a 3D model of the virtual space, e.g., presented in a "doll house" view allowing the user to see into various portions of the virtual space. In various implementations, the mini-map can be based on scans of a corresponding real-world place, can be structured according to a corresponding real-world place but have a different skin applied, or can be a fictional space. The user may be able to perform various controls to e.g., scroll or otherwise select portions of the mini-map to view, zoom in/out on various sections, rotate the mini-map, etc. In some cases, when a user performs a zoom operation on the mini-map, the immediate area around the user's avatar stays static while other portions of the mini-map are zoomed (see e.g., FIG. 9).

In some implementations, process 500 can provide spatial audio to the user according to the avatar positions in the mini-map. For example, when a user's avatar enters a portion of the mini-map inhabited by others' avatars, where those others are speaking, the user may be able to hear the conversation from a direction corresponding to the orientation of the other users' avatars to that user's avatar.

In some implementations, the mini-map may also show versions of virtual content that users of the virtual space are viewing, e.g., the mini map can show which model, documents, etc. a user is viewing. Thus, the mini-map can show versions of the artificial reality environments of the various users in the virtual space, stitched together to form a contiguous whole. In some cases, when a user's avatar is within a threshold distance of a content item displayed in the mini-map, (which may be shown in the mini-map as a virtual bubble or other area indication around the user's avatar), that content item can be is instantiated on the user's device such that the full version is presented in the user's artificial reality environment.

In some cases, a mini-map can provide additional controls and tools for content or user discovery and privacy. In some implementations, this can include search tools, allowing the user to enter (type or say) topics or other semantic tags to discover matching content items or users in the mini-map. In some cases, the mini-map can include filter options, allowing the user to turn on/off content layers: e.g., people, or certain groups of people (e.g., only show team members or people identified as "friends"), certain categories of content items (e.g., enabling or disabling social objects, showing or hiding others' virtual content items in the mini-map, etc.), and/or setting a granularity for how many others' content items to display in the mini-map. Further, users may set controls for which other people can see their avatar in the mini-map (e.g., anyone, only team members, only users in certain departments, only managers, specific people, etc.), or conditions for when their avatar is or is not shown (e.g., don't show when user sets a privacy flag, don't show in certain areas such as a private conference room or lavatory), etc.

At block 506, process 500 can update a view of the mini-map in response to a movement command or environment update. In some cases, a movement command can result from a user instructing her avatar to move in the mini-map (e.g., by grabbing and dropping her avatar somewhere else in the mini-map, using arrows to have the avatar walk to a new location, selecting a mini-map destination for the avatar—such as from a saved list of spaces, etc.) In other cases, a movement command can result from a user making movements in the real-world space corresponding to the virtual space, where those movements are tracked and process 500 uses them to update the avatar's location. Thus, when a user is in a physical space corresponding to the virtual space, their XR device or mobile phone can provide live location information for updating the corresponding avatar in the virtual space. Alternatively, a badge may provide periodic location information, such as when the user scans into a conference room or is near an RFID reader, which process 500 can use to update the corresponding avatar location. In some cases, a user may be able to move her avatar without physically moving in a real-world space (such as for users who are not in physical the corresponding real-world space), while in other cases the avatar's position may be linked to the user's physical location (such as for users who are in the physical the corresponding real-world space and have not overridden the avatar position with another movement command). In some implementations, avatars may be shown to be walking between locations following a movement command to go to a particular destination, as opposed to simply teleporting the avatar to the destination, allowing for process 500 to simulate how people in the real-world are able to discover other people and interact when walking around (e.g., in an office). The mini-map can also update based on environment changes, such as another avatar moving, a user changing which content items they are working on, a command such as to change a perspective or zoom amount on the mini-map, etc.

At block 508, process 500 can determine whether an exit command has been received. In various implementations, an exit command can take the form of an explicit command such as the user closing the mini-map or another application associated with the virtual space, the user issuing a close voice command or performing a particular gesture, etc. In other cases, the exit command can be implied, e.g., when a user in a real-world space, corresponding to the virtual space, leaves the real-world space. Until the exit command is received, process 500 can remain at block 506 updating the mini-map in response to avatar movements and other environment updates. When the exit command is received, process 500 can continue to block 510.

At block 510, process 500 can close mini-map. This can include various related actions such as saving state for the mini-map, providing notifications to the user or other users regarding the user leaving the virtual space, etc. After block 510, process 500 can end.

Figure 6:
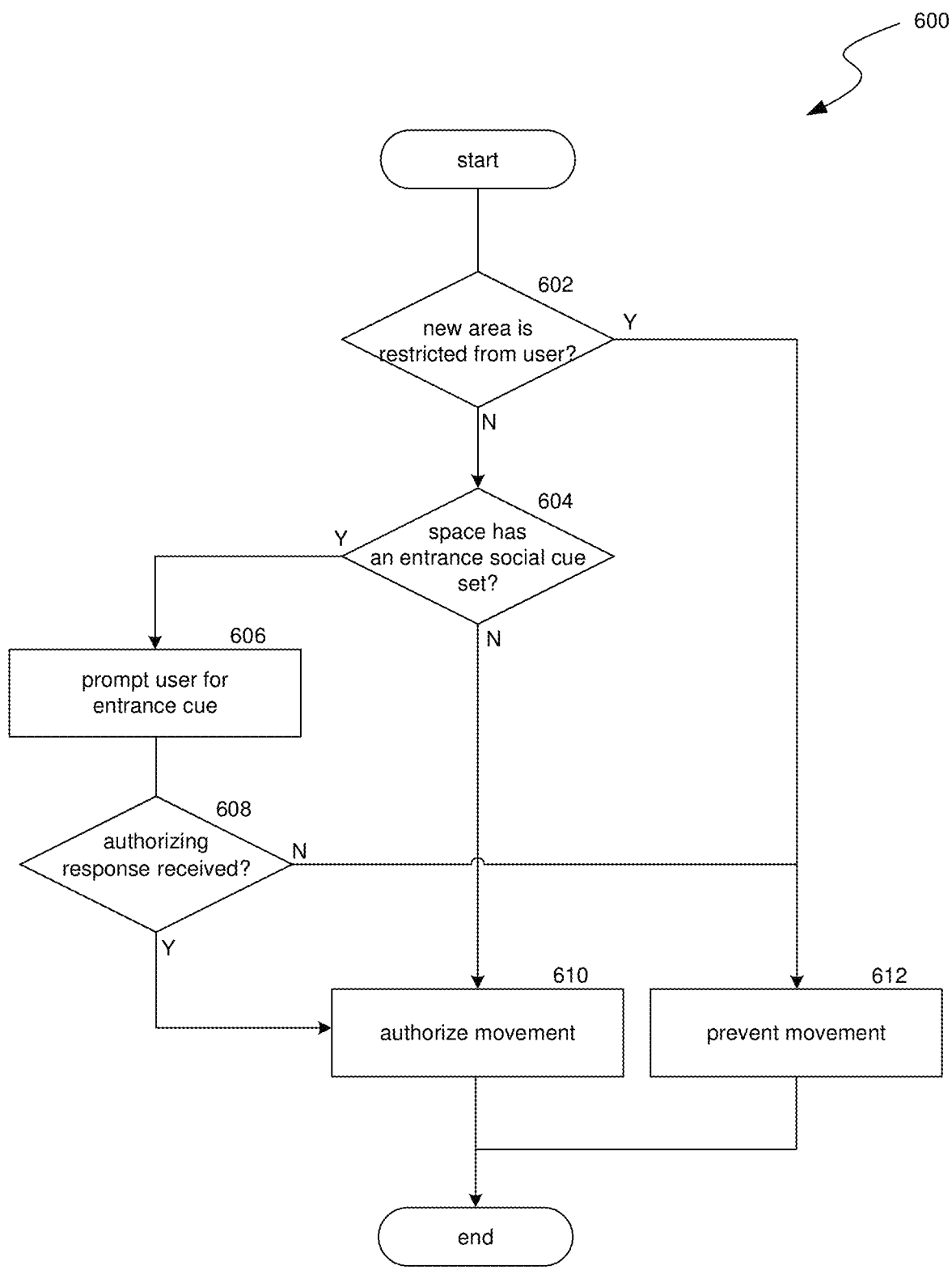
FIG. 6 is a flow diagram illustrating a process used in some implementations for determining authorization to enter a virtual space.

FIG. 6 is a flow diagram illustrating a process 600 used in some implementations for determining authorization to enter a virtual space. In some cases, process 600 can be performed as a sub-process of process 500, e.g., as a precursor to accepting a movement command in block 506.

When a movement command is issued, process 600 can determine whether to implement that movement command based on whether the user has access to a new area destination into which the movement command will cause the user's avatar to move. At block 602, process 600 can determine whether the user is restricted from entering the new area. If the user does not have permissions for the new area (for example where the new area is set to "do not disturb" or is only accessible to certain people), process 600 can proceed to block 612. If the user is not fully restricted from the new area, process 600 can proceed to block 606.

At block 604, process 600 can determine whether the new area has an entrance social cue set. An entrance social cue can define a particular action that A) a user wanting to enter a space and/or B) a space owner must perform for the user to enter that space. An example of an entrance social cue is a "knock-to-approach" interaction, whereby a user wanting to enter a space causes her avatar to move near that space and then issues a "knock" command (e.g., by actually making a knock gesture, by activating a knock UI, or automatically as a result of selecting the restricted space as a destination). Such a knock command can cause a knock sound to be played and/or a visual notification to be shown for the space owner. As another example, an entrance social queue can allow a user to teleport into or otherwise enter the restricted space, however the user's avatar can be displayed as grayed out or blurred and/or they may not be able to take certain actions (e.g., providing audio in the space, bringing up content items, or seeing content items displayed in the space) until the space owner fully admits them. If an entrance social cue is set, process 600 can proceed to block 604, otherwise process 600 can proceed to block 610.

At block 606, process 600 can prompt the user for the entrance social cue (unless it is performed automatically), such as by providing an indication to the user they should perform a knock gesture if they want to enter the restricted space. At block 608, process 600 can determine whether an authorizing response from the space owner is received. For example, the space owner may be notified through audio and/or visuals that someone has performed the entrance social cue. The space owner may also be provided with details such as an identity of the user who performed the entrance social cue. If the space owner provided a response authorizing entrance, process 600 can proceed to block 610; otherwise process 600 can proceed to block 612.

At block 610, process 600 can authorize the movement, allowing the avatar to enter the new area. Following block 610, if process 600 was started from process 500, process 600 can return to block 506, performing block 506. At block 612, process 600 can prevent the movement. Following block 612, if process 600 was started from process 500, process 600 can return skipping over block 506. Following block 610 or 612, process 600 can end.

Figure 7:
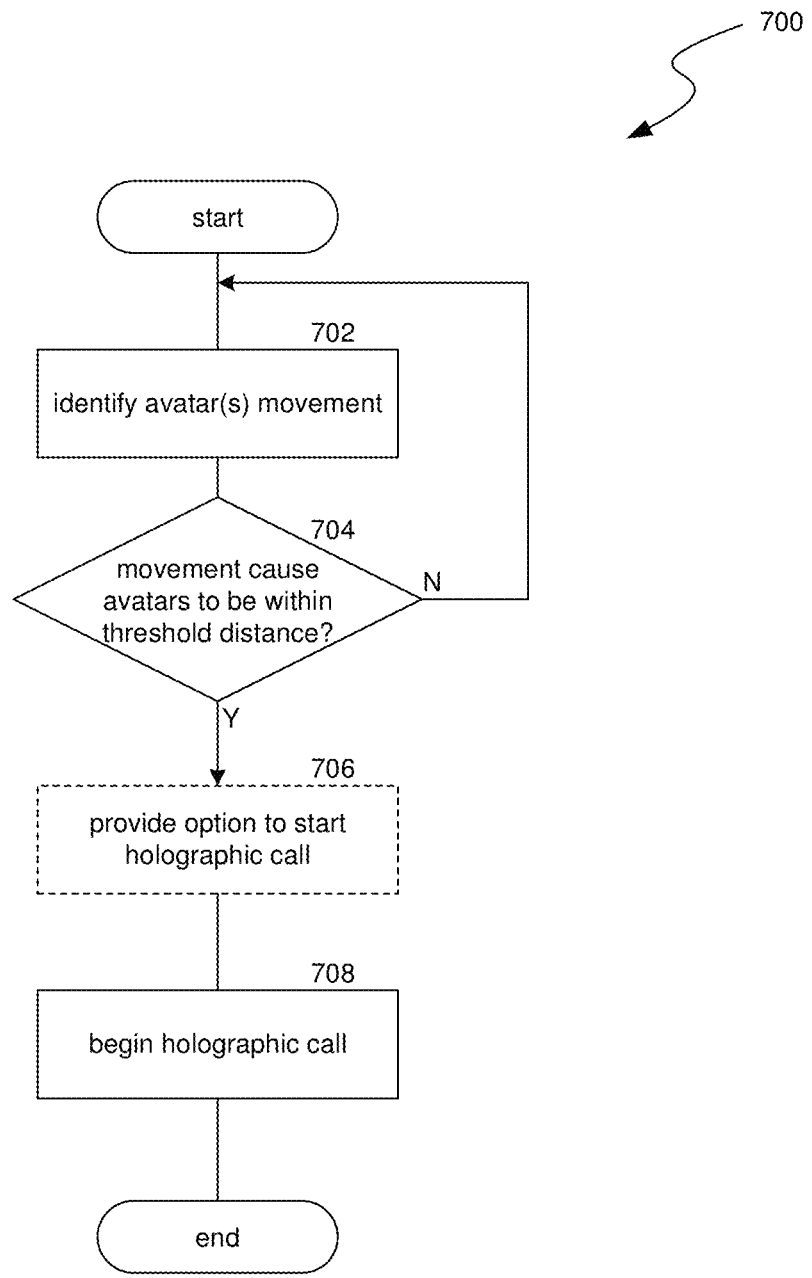
FIG. 7 is a flow diagram illustrating a process used in some implementations for triggering a holographic call based on an avatar distance threshold.

FIG. 7 is a flow diagram illustrating a process 700 used in some implementations for triggering a holographic call based on an avatar distance threshold. In various implementations, process 700 can be performed on a client system (such as an artificial reality device or mobile phone) or a server system (such as one or more servers providing services to one or more artificial reality devices). In various cases, process 700 can be performed in response to the creation of a virtual space, when an artificial reality device is started or when the artificial reality device starts an application or service that supports virtual spaces (e.g., an operating system, "shell" in control of an artificial reality environment, a third-party application, etc.)

At block 702, process 700 can identify a movement of one or more avatars in a mini-map. An avatar can be moved in the mini-map in response to a user instruction e.g., by grabbing and dropping her avatar somewhere else in the mini-map, using arrows to have the avatar walk to a new location, selecting a mini-map destination for the avatar—such as from a saved list of spaces, etc. In other cases, the avatar movement can result from a user making movements in the real-world space corresponding to the virtual space, where those movements are tracked and process 700 uses them to update the avatar's location. Alternatively, a badge may provide periodic location information, such as when the user scan into a conference room or is near an RFID reader, which process 700 can use to update the corresponding avatar location.

At block 704, process 700 can determine whether the movement(s) identified at block 702 cause two or more avatars to be within a threshold distance of one another. In some implementations, decision block 704 only results in the yes branch when at least one of the two or more avatars is registered as being remotely connected to the virtual space. Thus, a holographic call may only be initiated when some of the participants are not within the same physical space. If the movement causes the one or more avatars to be within the threshold distance, process 700 can continue to block 706, otherwise process 700 can return to block 702 to identify further avatar movements.

While any block can be removed or rearranged in various implementations, block 706 is shown in dashed lines to indicate there are specific instances where block 706 is skipped. At block 706, process 700 can provide an option for the users corresponding to the avatars to enter a holographic call. For example, process 700 can present a notification such as in a modal window, an audio signal, etc., with an option for the user to enter a holographic call.

At block 708, process 700 can begin a holographic call between one or more of the users corresponding to the avatars. In some implementations, the holographic call be initiated only for those users who selected to initiate the call at block 706. A holographic calling system can capture and encode holographic data at a sender-side of a holographic calling pipeline and decode and present the holographic data as a 3D representation of a sender at a receiver-side of the holographic calling pipeline. In some cases, holographic calling in augmented reality allows users to have a conversation, appearing as if they are face-to-face in 3D space. A holographic calling system can provide holographic calls between any combination of artificial reality (XR) devices, mobile devices (e.g., smartphones), traditional computing systems (e.g., a laptop or desktop with a webcam), etc. The experience of each user may depend on the capture and processing capabilities of the sending system and the display and processing capabilities of the receiving system. For example, where one user is using a mobile phone and another is using an XR system, the user of the XR system may see a hologram of the other user in their space while the mobile phone user may see a representation of the other user on their phone screen. Process 700 can present the holographic call in the artificial reality environment in addition to the mini-map or can close the mini-map while the holographic call is ongoing. Additional details on holographic calling are provided in U.S. patent application Ser. No. 17/360,693, titled "Holographic Calling for Artificial Reality," filed Jun. 28, 2021, which is herein incorporated by reference in its entirety.

Figure 8A:
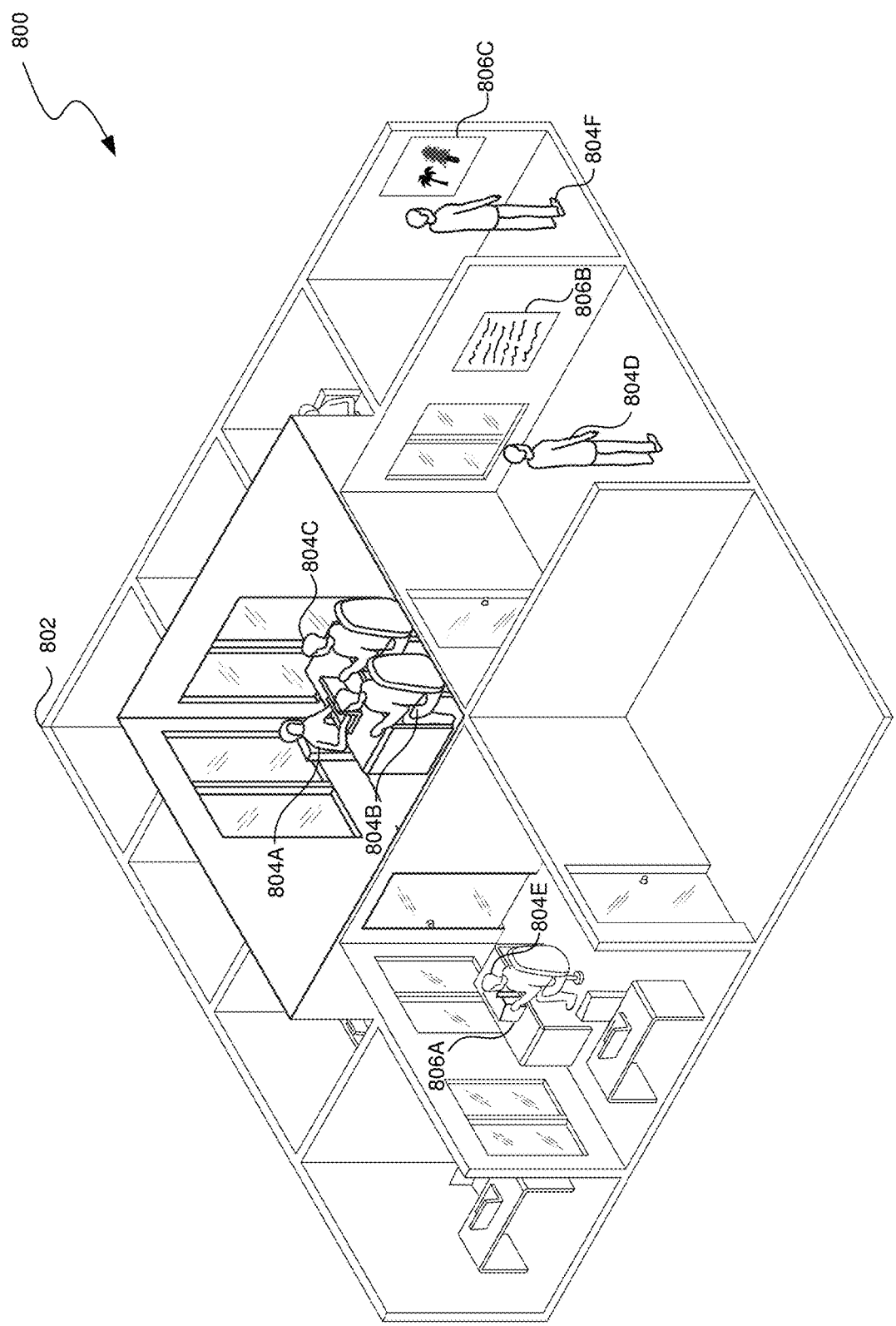
FIGS. 8A and 8B are conceptual diagrams illustrating examples of mini-maps of a virtual space corresponding to a real-world space.
Figure 8B:
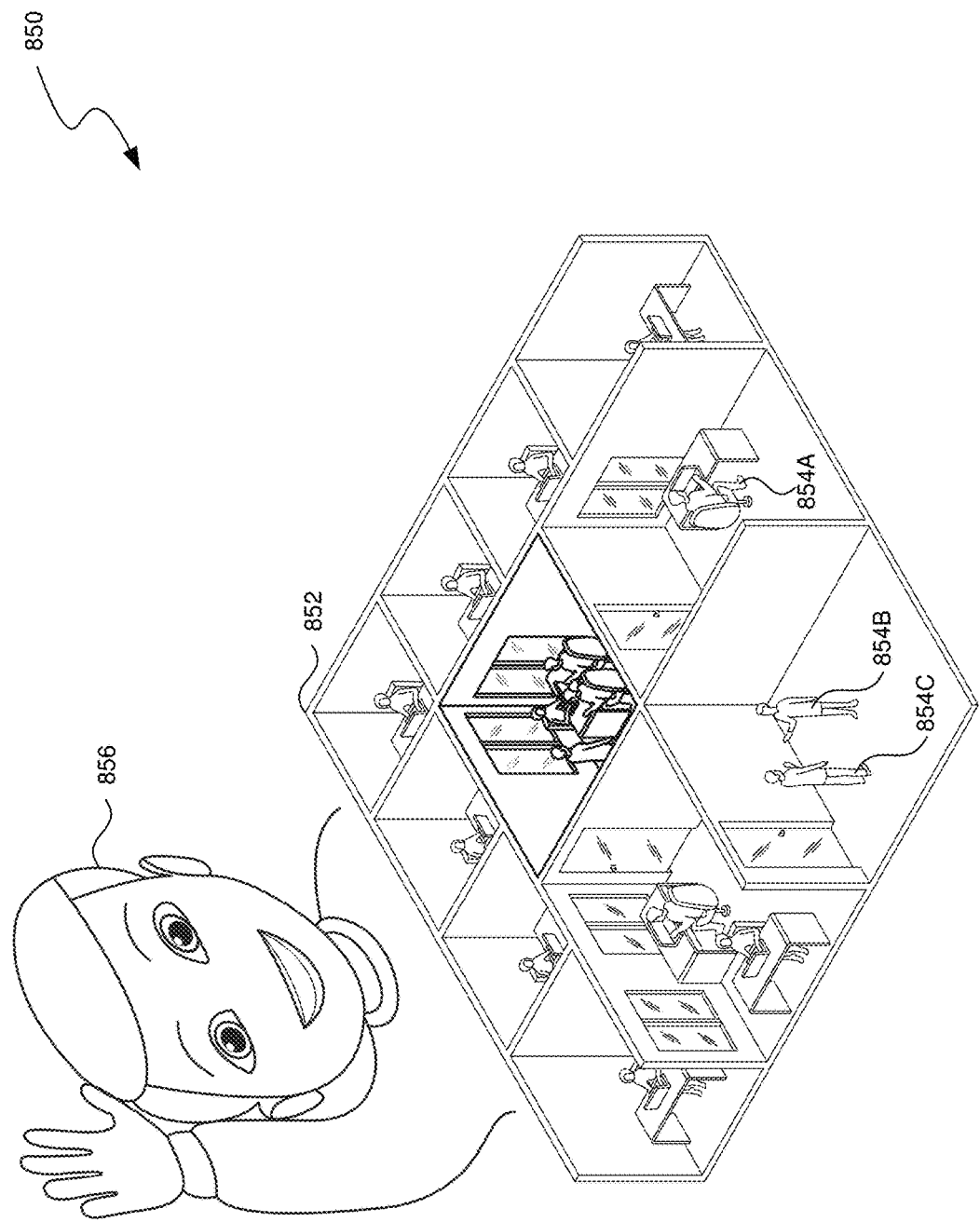

FIGS. 8A and 8B are conceptual diagrams illustrating examples 800 and 850 of mini-maps of a virtual space corresponding to a real-world space. FIG. 8A illustrates a first example 800 in which a mini-map 802 is displayed, which corresponds to a real-world space. The mini-map 802 includes representations of avatars 804A-F. Avatars 804B, 804D, and 804F are representations of users who are in the real-world space and are displayed in the mini-map 802 according to the locations of the corresponding users in the real-world space. Avatars 804A, 804C, and 804E are representations of users who have joined the virtual space remotely (i.e., without being in the corresponding real-world space) and thus control their avatar locations in the mini-map according to movement commands. In some implementations, the mini-map 802 can also include miniature versions 806A-C of content items that the users represented by avatars 804A-F are working on, e.g., the mini-map 802 can show which 3D model, document, etc. the various users are working with. In some implementations, when a user's avatar is caused to move within a threshold distance of such a displayed content item, that content item is instantiated on the user's XR device and the full version is brought into the user's artificial reality environment. FIG. 8B illustrates a second example 850 in which a mini-map 852 is displayed in relation to a user 852. The mini-map 852 includes representations of avatars 854A-C. Example 850 also illustrates a user 856, to illustrate one potential scale of mini-maps, such as mini-map 852.

Figure 9:
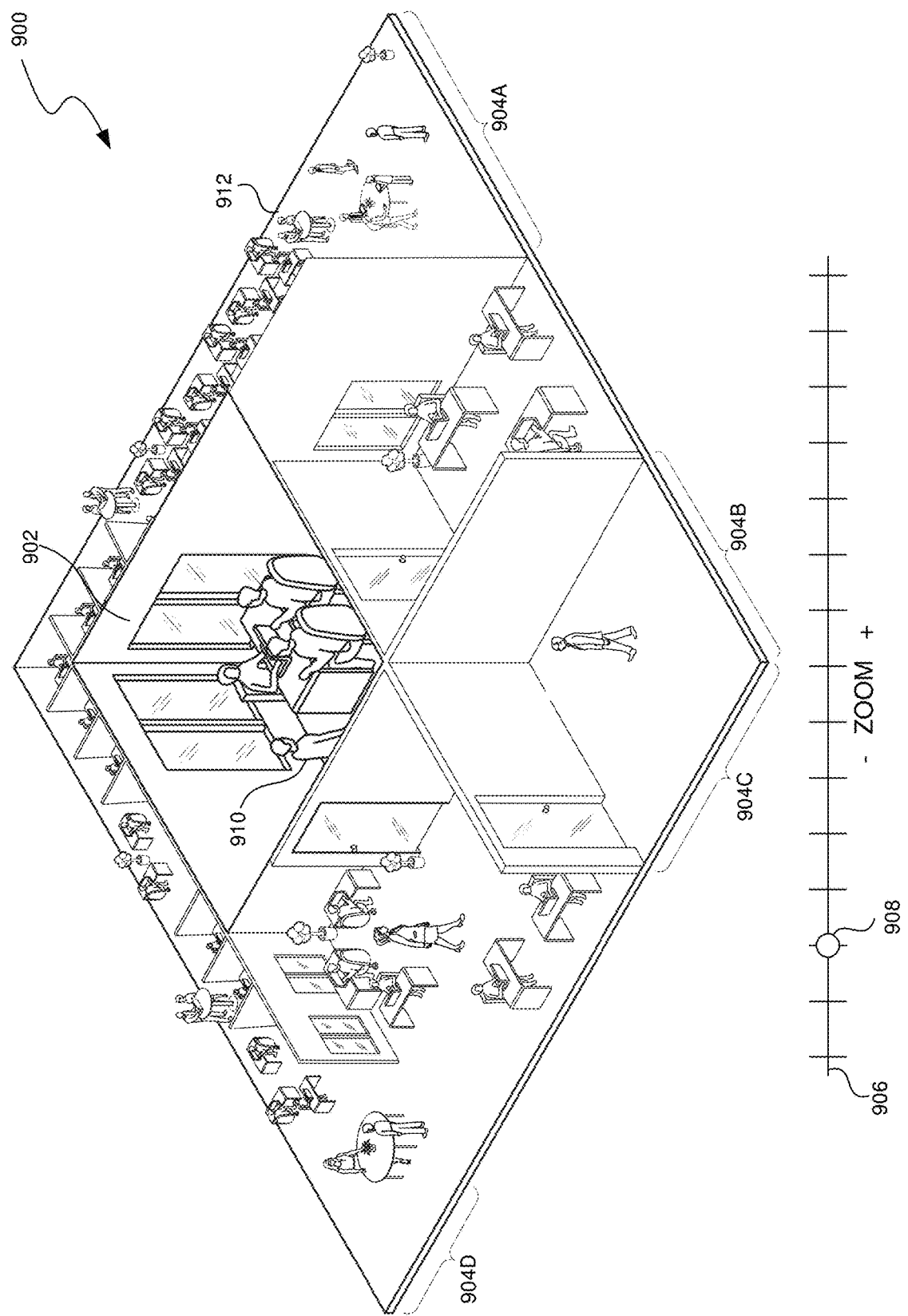
FIG. 9 is a conceptual diagram illustrating an example of zooming out areas of a mini-map excluding the user's current area.

FIG. 9 is a conceptual diagram illustrating an example 900 of zooming out areas of a mini-map excluding the user's current area. Example 900 includes a zoom control 906 which sets how much of a virtual space, outside area 902, is displayed in the mini-map 912. In example 900, a user represented by avatar 910 is the current user viewing the mini-map 912. Thus, the area 902 immediately surrounding the avatar 910 is kept at a consistent size. In various implementations, the area 902 can be the room the avatar 910 is in or a threshold distance around the avatar 910. As the user manipulates the control 908 in the zoom control 906, the areas 904A-D are zoomed to show more or less of the virtual space. In example 900, the control 908 is zoomed out, causing the areas 904A-D to show additional areas of the virtual space zoomed out as compared to area 902.

Figure 10A:
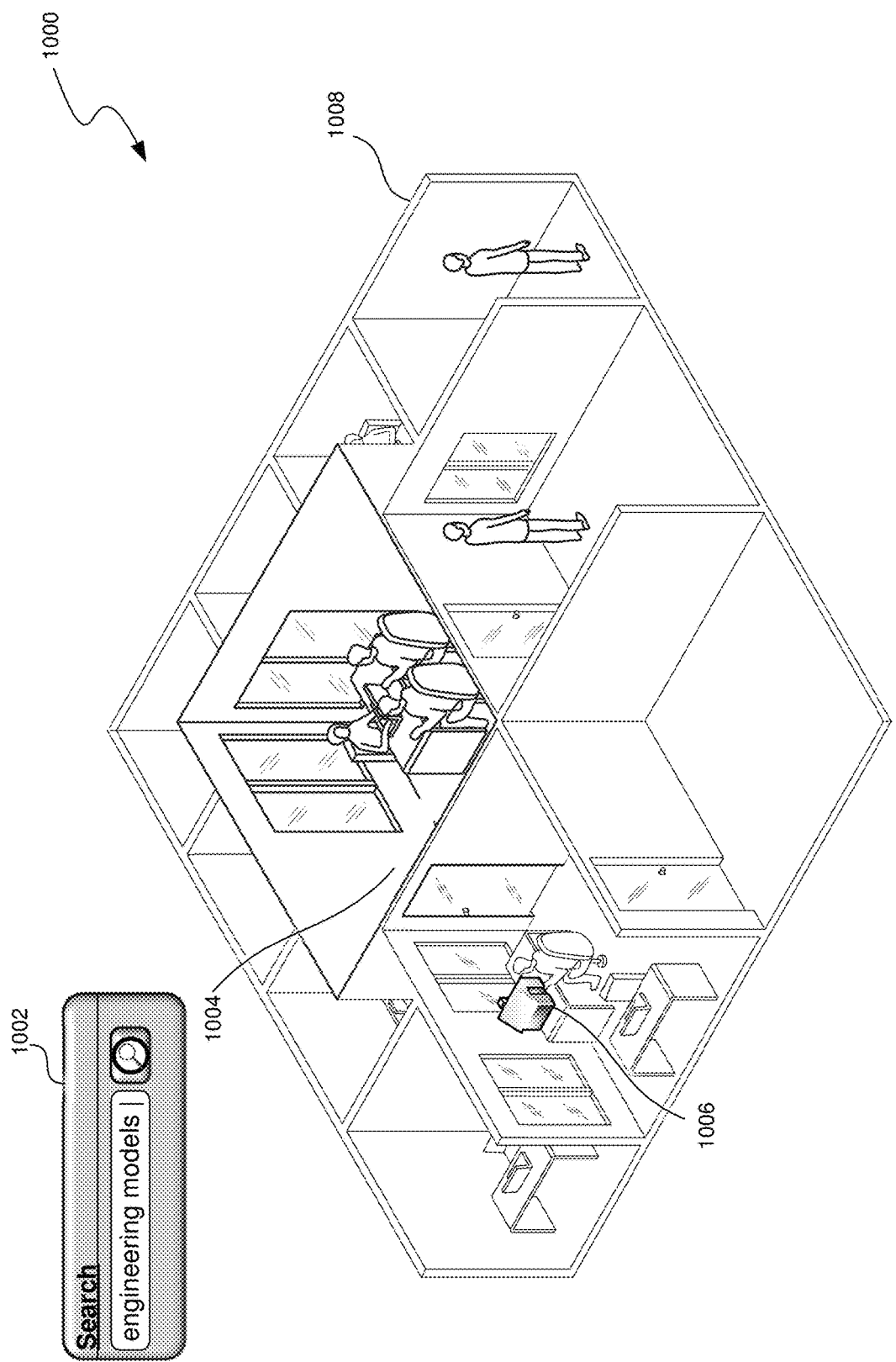
FIGS. 10A-10C are conceptual diagrams illustrating examples of discovery, filtering, and privacy controls for a mini-map.
Figure 10B:
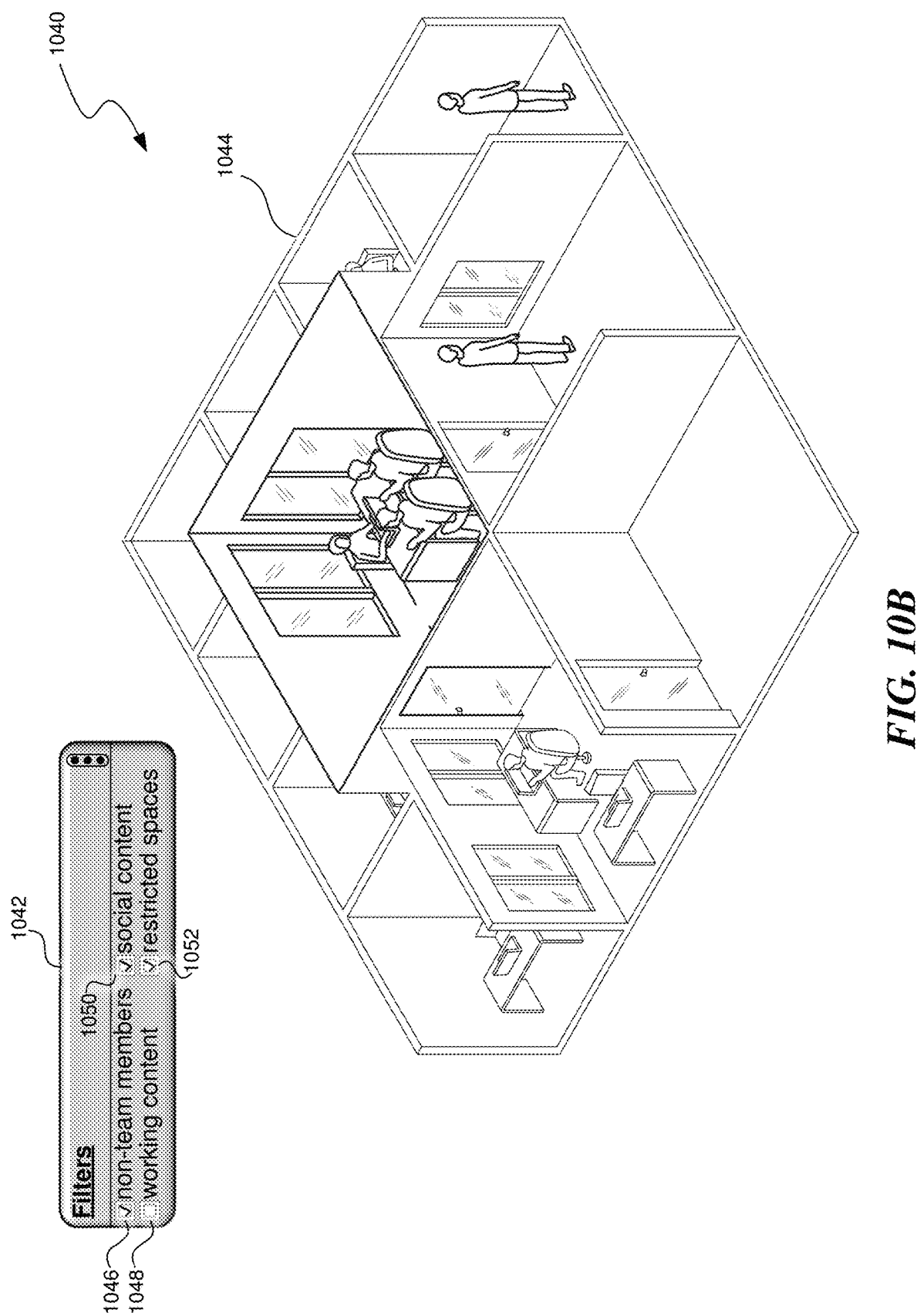
Figure 10C:
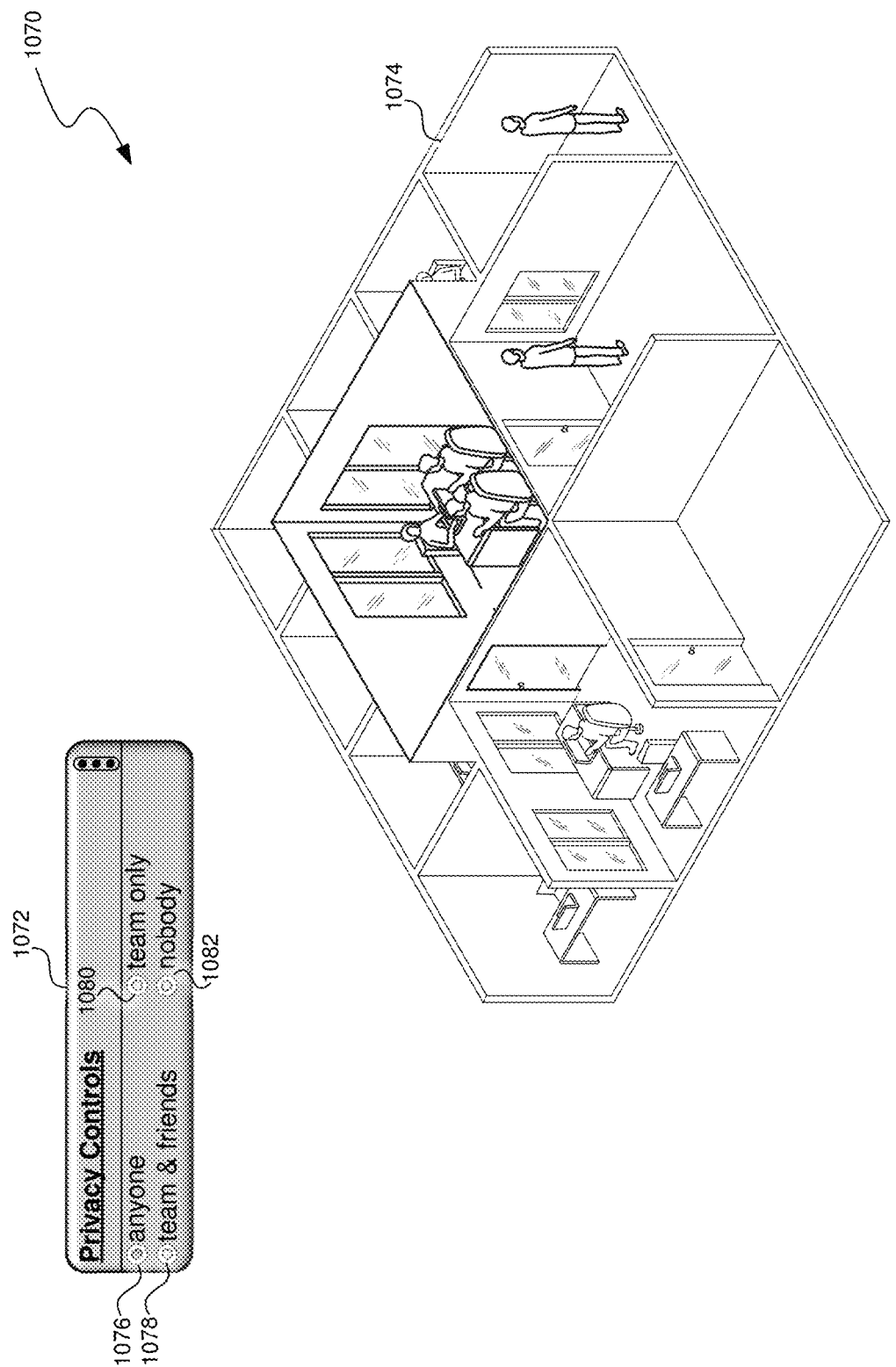

FIGS. 10A-10C are conceptual diagrams illustrating examples 1000, 1040, and 1070 of discovery, filtering, and privacy controls for a mini-map. Example 1000 illustrates a search control for searching mini-map 1008. In example 1000, a user has entered "engineering models" in the search space of search control 1002, which causes the mini-map 1008 to show models 1004 and 1006, which are models shown in the mini-map 1008 and associated with an "engineering" tag or which are being viewed by a user defined on an engineering team. A user can use the search control 1002 to search for content items and/or avatars that are associated with entered topics, tags, phrases, etc., thus using the mini-map 1008 to discover entities in the virtual space.

Example 1040 illustrates a set of filters controls 1042 for filtering what is shown in the mini-map 1044. By selecting filters in filter controls 1042, a user can turn on/off content layers such as a layer showing avatars other than those in a designated group (corresponding to the "non-team members" filter 1046), a layer showing content identified as social content such as greeting messages, comments, artwork, etc. (corresponding to the "social content" filter 1050), a layer showing content identified as working content such as documents or models that users, corresponding to avatars in the mini-map 1044, are currently working with (corresponding to the "working content" filter 1048), and a layer showing areas of the mini-map 1044 to which the current user does not have access to enter (corresponding to the "restricted spaces" filter 1052).

Example 1070 illustrates a set of privacy controls 1072 for selecting which other users can see the current user's avatar in the mini-map 1074. By selecting a privacy setting in privacy controls 1072, a user can determine which group of users can see the user's avatar, such as an "anyone" selection 1046 allowing anyone to see the user's avatar, a "team & friends" selection 1078 allowing only users specified as a friend of the user or that are on a working team with the user can see the user's avatar, a "team only" selection 1080 allowing only users specified as on a working team with the user can see the user's avatar, and a "nobody" selection 1082 disallowing everyone from seeing the user's avatar. In other implementations, additional selections of privacy controls could include options such as only users in certain departments, only managers, specific people, etc.

Figure 11A:
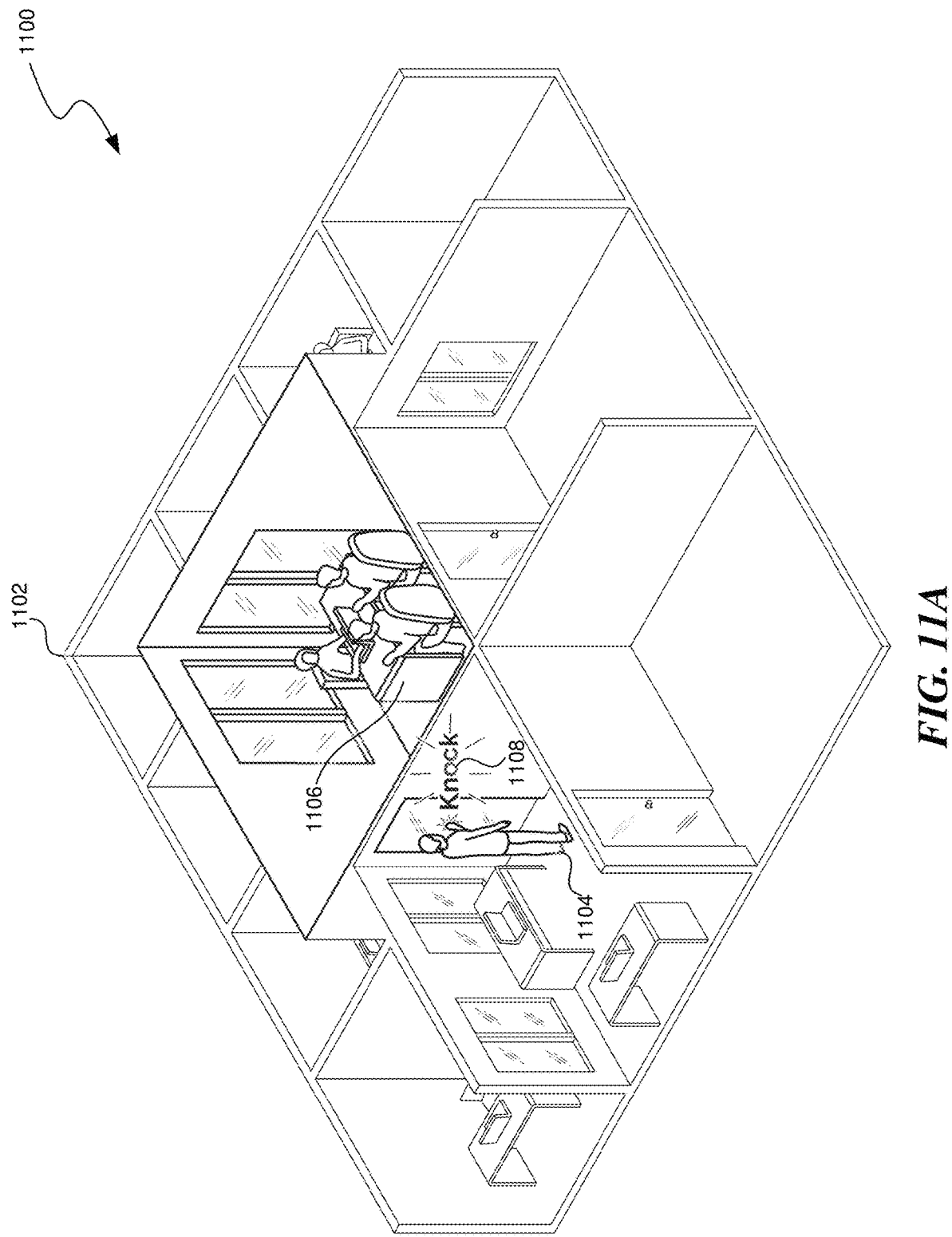
FIGS. 11A and 11B are conceptual diagrams illustrating examples of a knock-to-approach social cue interaction.
Figure 11B:
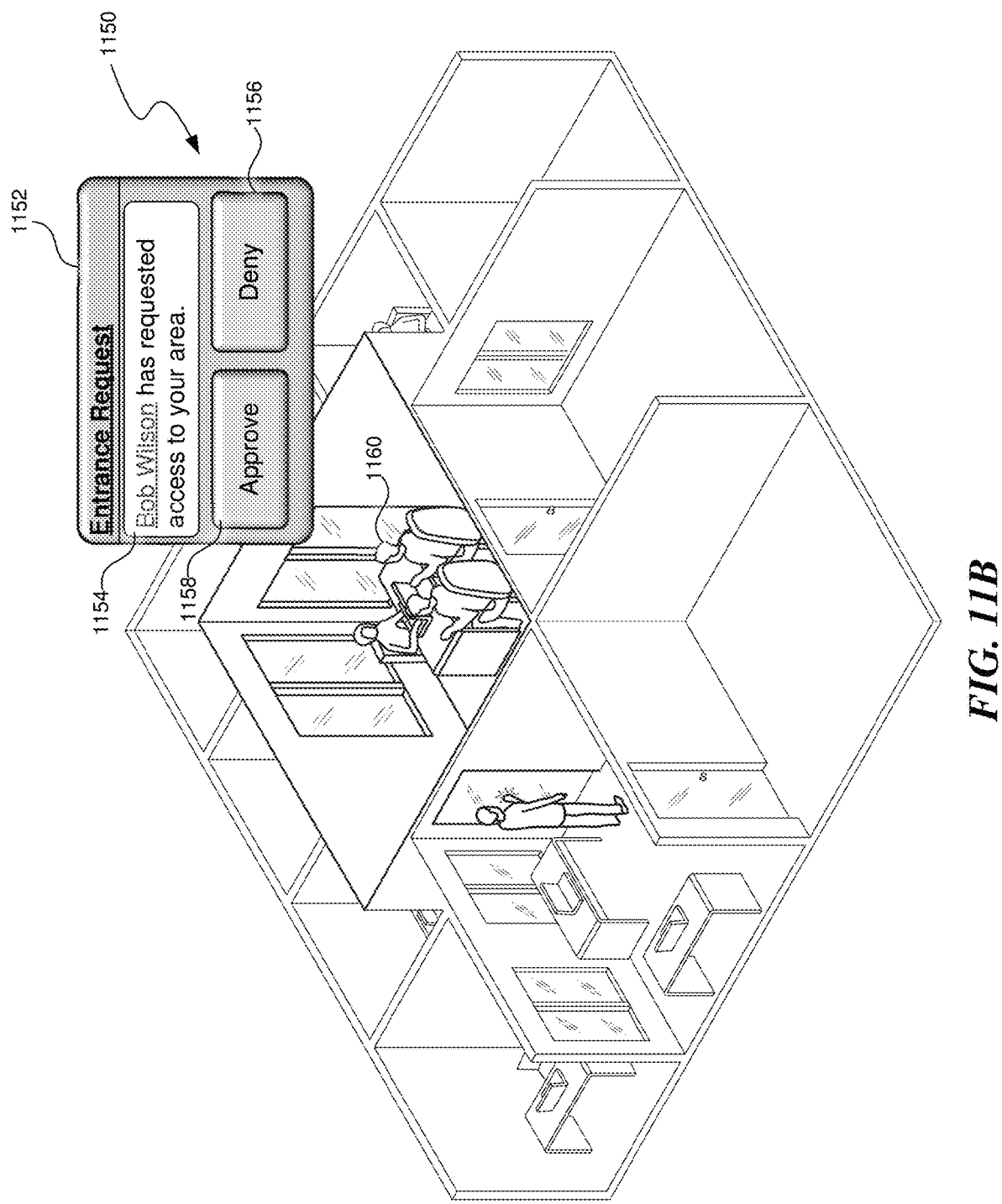

FIGS. 11A and 11B are conceptual diagrams illustrating examples 1100 and 1150 of a knock-to-approach social cue interaction. In example 1100, a user has controlled her avatar 1104, in mini-map 1102, to move into an area surrounding a table 1106. An owner of this area has established a knock-to-approach social cue for this area, disallowing avatars to enter it without performing the social cue and receiving approval. When the user controlling the avatar 1104 provides a movement control to move the avatar 1104 into the space around the table 1106, a prompt 1108 is displayed, instructing the user to make a knock gesture to request entrance to the new area. Example 1150 illustrates a view from an owner of the space around table 1106 (represented by avatar 1160). In example 1150, a knock sound has been placed for the space owner and the entrance request control 1152 has been shown. Entrance request control 1152 includes a description 1154 of the entrance request including who is making it, a link to more details on that person, and buttons 1158 and 1156 to approve or deny the entrance request. If the user selects the approve button 1158, the avatar 1104 is allowed to enter the area around the table 1106.

Figure 12A:
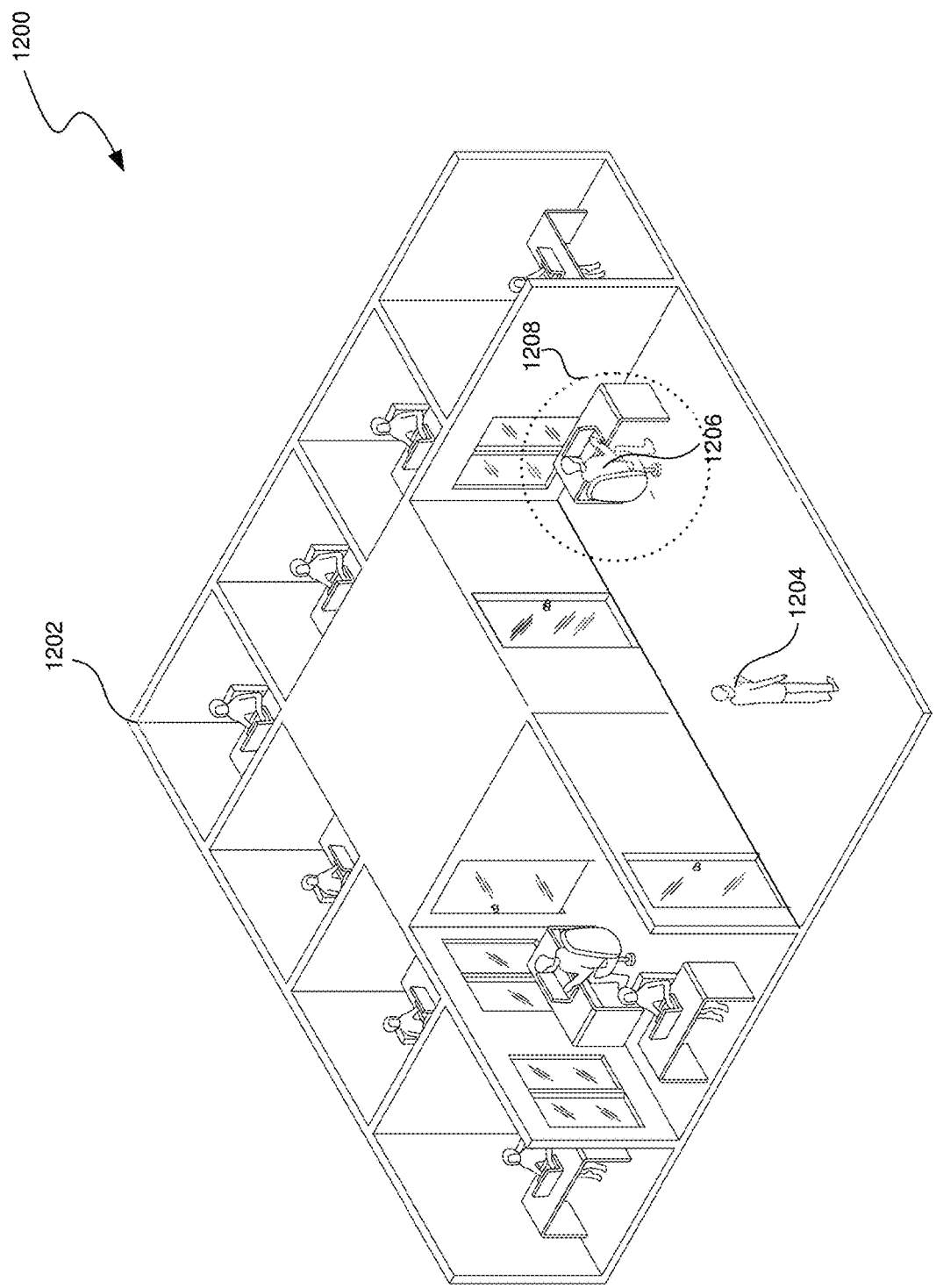
FIGS. 12A and 12B are conceptual diagrams illustrating example of an avatar distance threshold triggering a holographic call.
Figure 12B:
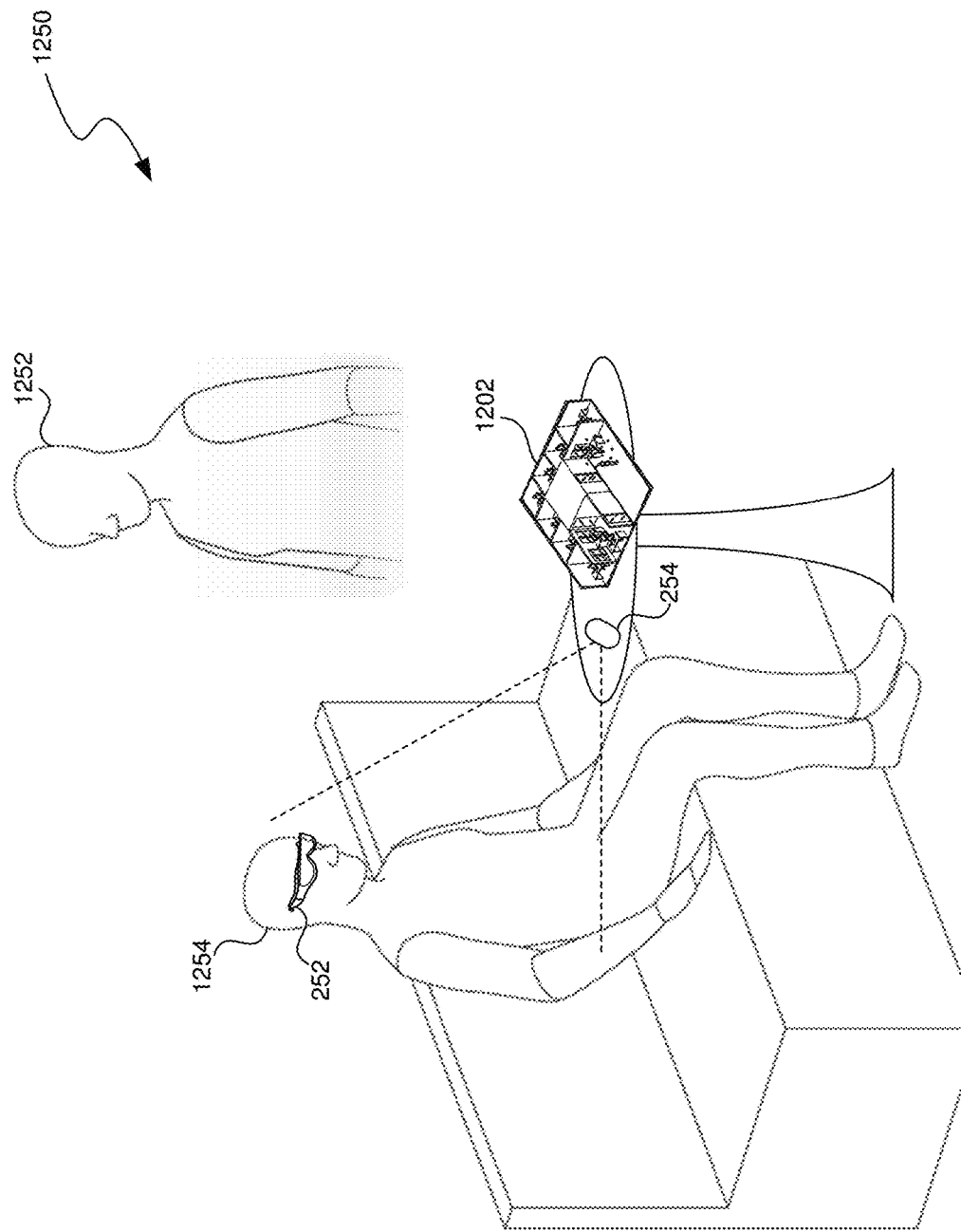

FIGS. 12A and 12B are conceptual diagrams illustrating example 1200 and 1250 of an avatar distance threshold triggering a holographic call. Example 1200 illustrates a mini-map 1202 in which a user is controlling the location of avatar 1204 to move close to avatar 1208. When the avatar 1204 moves within a threshold distance of avatar 1206 (as illustrated by border line 1208), the mini-map coordination system can automatically initiate a holograph call between the users corresponding to the avatars 1204 and 1206 (as illustrated in example 1250). In some implementations, prior to starting the holographic call, the mini-map coordination system can provide an option to one or both users asking if they would like to join the holographic call and the users are added to the holographic call only if they answer in the affirmative. In example 1250, a user 1254 is viewing the mini-map 1202 when his avatar is moved within the threshold distance of another avatar (as shown in example 1200). In response, a holographic call is initiated between the users 1254 and 1252, who these avatars represent. The holographic call includes images of the user 1254 being captured by device 254 and sending this data to an XR device of the user 1252, while holographic data of the user 1252 is captured and sent to the device 252, causing it to display the hologram of the user 1252 in addition to displaying the mini-map 1202.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for conducting a holographic call based on avatar positions in a mini-map, the method comprising:
   providing the mini-map for a virtual space corresponding to a real-world space, the mini-map being structured according to the real-world space,
      wherein multiple users have joined the virtual space and are each represented in the mini-map by an avatar, and
      wherein at least one of the multiple users has joined the virtual space while in the real-world space and at least one of the multiple users has joined the virtual space while not in the real-world space;
   updating the positions, of the avatars that correspond to at least one of the multiple users that joined the virtual space while not in the real-world space, in the mini-map according to movement commands issued by the users that the avatars represent;
   updating the positions, of the avatars that correspond to at least one of the multiple users that joined the virtual space while in the real-world space, based on real-world movements of the users that the avatars represent in the real-world space, the real-world movements of the users in the real-world space being tracked, at least partially, by matching identified objects and structures to mapped objects and structures for the real-world space;
   identifying both that two or more of the avatars are within a threshold distance of one another in the mini-map, wherein a first avatar of the two or more avatars represents a first user who has joined the virtual space from a location remote from the real-world space and a second avatar of the two or more avatars represents a second user who joined the virtual space while in the real-world space, wherein both the first avatar and the second avatar can traverse the virtual space corresponding to the real-world space; and
   in response to the identifying, initiating a holographic call between the users represented by the two or more of the avatars.

2. The method of claim 1, wherein at least one of the multiple users has joined the virtual space through an association between the virtual space and a meeting or call of which the at least one user is a participant.

3. The method of claim 1, wherein at least one of the multiple users has joined the virtual space by being detected as being in the real-world space, on which the virtual space is based, while wearing an XR device.

4. The method of claim 1, wherein at least a first of the multiple users has joined the virtual space using an artificial reality device and at least a second of the multiple users has joined the virtual space using a mobile phone.

5. The method of claim 1, wherein at least some of the movement commands are based on a user, who joined the virtual space while not in the real-world space, specifying a direction and/or destination for that user's avatar.

6. The method of claim 1 further comprising, prior to the initiating the holographic call, providing an option, to the users represented by the two or more of the avatars, to start the holographic call, wherein the initiating the holographic call is further in response to the users represented by the two or more of the avatars accepting the option to start the holographic call.

7. The method of claim 1, wherein, in response to a control selection by one of the multiple users, the mini-map displayed to that user is updated to:
   show a portion of the mini-map not containing the avatar representing that user; or
   zoom in or out on a section of the mini-map.

8. The method of claim 1, wherein, in response to a zoom control selection by one of the multiple users, the mini-map displayed to that user is updated to zoom in or out on an area of the mini-map such that an area around the avatar representing that user stays static while other portions of the mini-map are zoomed.

9. The method of claim 1 further comprising receiving an audio input from a first of the multiple users and providing the audio input to a second of the multiple users via spatial audio such that the second of the multiple users hears the audio input as coming from a direction corresponding to the orientation of the avatar representing the first user in relation to the avatar representing the second user.

10. The method of claim 1,
wherein the mini-map shows versions of one or more virtual content items that one of the multiple users is viewing; and
wherein, in response to the avatar representing a second of the multiple users coming within a threshold distance of the one or more virtual content items in the mini-map, the one or more virtual content items are obtained by an artificial reality device of the second user and instantiated into an artificial reality environment provided by the artificial reality device of the second user.

11. The method of claim 1,
wherein search tools are associated with the mini-map providing a user, of the multiple users, controls to provide semantic tags and, in response, receive indications in the mini-map of content items or users that match one or more of the semantic tags; and
wherein filter tools are associated with the mini-map providing the user controls to select one or more categories and, in response, see an updated version of the mini-map of with only content items or users that match the selected one or more categories.

12. The method of claim 1, wherein, prior to updating the positions of the avatars in the mini-map according to movement commands, the method further comprises:
determining that a destination for a movement command for a third user, of the multiple users, corresponds to a sub-space, of the virtual space, with an entrance social cue set;
providing an indication to the third user to perform the entrance social cue; and
receiving from a fourth user, in response to the third user performing the entrance social cue, an authorization to enter the sub-space;
wherein the updating the position of the avatar representing the third user is in response to the receiving the authorization to enter the sub-space.

13. A computer-readable storage medium storing instructions that, when executed by a computing system, cause the computing system to perform a process for conducting a holographic call based on avatar positions in a mini-map, the process comprising:
providing the mini-map for a virtual space corresponding to a real-world space, the mini-map being structured according to the real-world space,
wherein multiple users have joined the virtual space and are each represented in the mini-map by an avatar, and
wherein at least one of the multiple users has joined the virtual space while in the real-world space and at least one of the multiple users has joined the virtual space while not in the real-world space;
updating the positions, of the avatars that correspond to at least one of the multiple users that joined the virtual space while not in the real-world space, in the mini-map according to movement commands;
updating the positions, of the avatars that correspond to at least one of the multiple users that joined the virtual space while in the real-world space, based on real-world movements of the users that the avatars represent in the real-world space, the real-world movements of the users in the real-world space being tracked, at least partially, by matching identified objects and structures to mapped objects and structures for the real-world space;
identifying both that two or more of the avatars are within a threshold distance of one another in the mini-map, wherein a first avatar of the two or more avatars represents a first user who has joined the virtual space from a location remote from the real-world space and a second avatar of the two or more avatars represents a second user who joined the virtual space while in the real-world space, wherein both the first avatar and the second avatar can traverse the virtual space corresponding to the real-world space; and
in response to the identifying, initiating a holographic call between the users represented by the two or more of the avatars.

14. The computer-readable storage medium of claim 13, wherein at least one of the multiple users has joined the virtual space by being detected as being in the real-world space, on which the virtual space is based, while wearing an XR device.

15. The computer-readable storage medium of claim 13, wherein, prior to updating the positions of the avatars in the mini-map according to movement commands, the process further comprises:
determining that a destination for a movement command for a third user, of the multiple users, corresponds to a sub-space, of the virtual space, with an entrance social cue set;
automatically causing a fourth user to receive the entrance social cue; and
receiving from the fourth user, in response to the entrance social cue, an authorization to enter the sub-space;
wherein the updating the position of the avatar representing the third user is in response to the receiving the authorization to enter the sub-space.

16. A computing system for conducting a holographic call based on avatar positions in a mini-map, the computing system comprising:
one or more processors; and
one or more memories storing instructions that, when executed by the one or more processors, cause the computing system to perform a process comprising:
providing the mini-map for a virtual space corresponding to a real-world space, the mini-map being structured according to the real-world space,
wherein multiple users have joined the virtual space and are each represented in the mini-map by an avatar, and
wherein at least one of the multiple users has joined the virtual space while in the real-world space and at least one of the multiple users has joined the virtual space while not in the real-world space;
updating the positions, of the avatars that correspond to at least one of the multiple users that joined the virtual space while not in the real-world space, in the mini-map according to movement commands;
updating the positions, of the avatars that correspond to at least one of the multiple users that joined the virtual space while in the real-world space, based on real-world movements of the users that the avatars represent in the real-world space, the real-world movements of the users in the real-world space being tracked, at least partially, by matching identified objects and structures to mapped objects and structures for the real-world space;
identifying that two or more of the avatars are within a threshold distance of one another in the mini-map, wherein a first avatar of the two or more avatars represents a first user who has joined the virtual space from a location remote from the real-world space and a second avatar of the two or more avatars represents a second user who joined the virtual space while in the real-world space, wherein both the first avatar and the second avatar can traverse the virtual space corresponding to the real-world space; and in response to the identifying, initiating a holographic call between the users represented by the two or more of the avatars.

17. The computing system of claim 16, wherein, in response to a zoom control selection by one of the multiple users, the mini-map displayed to that user is updated to zoom in or out on an area of the mini-map such that an area around the avatar representing that user stays static while other portions of the mini-map are zoomed.

18. The computing system of claim 16,
wherein the mini-map shows versions of one or more virtual content items that one of the multiple users is viewing; and
wherein, in response to the avatar representing a second of the multiple users coming within a threshold distance of the one or more virtual content items in the mini-map, the one or more virtual content items are obtained by an artificial reality device of the second user and instantiated into an artificial reality environment provided by the artificial reality device of the second user.

19. The computing system of claim 16,
wherein at least one of the multiple users has joined the virtual space by being detected as being in the real-world space, on which the virtual space is based, while wearing an XR device.

20. The computing system of claim 16,
wherein search tools are associated with the mini-map providing a user, of the multiple users, controls to provide semantic tags and, in response, receive indications in the mini-map of content items or users that match one or more of the semantic tags; and
wherein filter tools are associated with the mini-map providing the user controls to select one or more categories and, in response, see an updated version of the mini-map of with only content items or users that match the selected one or more categories.

* * * * *